United States Patent
Matsuda et al.

(10) Patent No.: US 11,516,790 B2
(45) Date of Patent: Nov. 29, 2022

(54) WIRELESS COMMUNICATION APPARATUS AND WIRELESS COMMUNICATION METHOD

(71) Applicant: SONY CORPORATION, Tokyo (JP)

(72) Inventors: Hiroki Matsuda, Tokyo (JP);
Kazuyuki Shimezawa, Kanagawa (JP);
Naoki Kusashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/649,273

(22) PCT Filed: Sep. 14, 2018

(86) PCT No.: PCT/JP2018/034184
§ 371 (c)(1),
(2) Date: Mar. 20, 2020

(87) PCT Pub. No.: WO2019/065307
PCT Pub. Date: Apr. 4, 2019

(65) Prior Publication Data
US 2020/0296699 A1    Sep. 17, 2020

(30) Foreign Application Priority Data

Sep. 29, 2017    (JP) .............................. JP2017-189613

(51) Int. Cl.
*H04W 72/04*    (2009.01)
*H04W 28/18*    (2009.01)
(52) U.S. Cl.
CPC ......... *H04W 72/042* (2013.01); *H04W 28/18* (2013.01)
(58) Field of Classification Search
CPC ................ H04W 72/042; H04W 28/18; H04L 27/26025; H04L 5/0094; H04L 5/0053; H04L 5/0044; H04L 5/0007
See application file for complete search history.

(56) References Cited

U.S. PATENT DOCUMENTS

| | | | |
|---|---|---|---|
| 10,932,198 B2 * | 2/2021 | Seo | ............ H04L 1/0013 |
| 2013/0272281 A1 * | 10/2013 | Xu | ............ H04L 1/1812 370/336 |

(Continued)

FOREIGN PATENT DOCUMENTS

| | | |
|---|---|---|
| EP | 3138227 A1 | 3/2017 |
| EP | 3641170 A1 | 4/2020 |

(Continued)

OTHER PUBLICATIONS

"Discussion on non-orthogonal multiple access", Samsung, 3GPP TSG RAN WG1, Meeting 88b, Spokane, Washington, USA, R1-1706119, Apr. 3-7, 2017, 06 pages.

(Continued)

*Primary Examiner* — Phirin Sam
*Assistant Examiner* — Tarell A Hampton
(74) *Attorney, Agent, or Firm* — Chip Law Group

(57) ABSTRACT

To provide a wireless communication apparatus that makes it possible to perform wireless communication more efficiently by switching setting or the like for transmission or reception in accordance with whether the wireless communication is non-orthogonal multiple access or orthogonal multiple access. [Solution] There is provided a wireless communication apparatus including: a communication section that performs wireless communication; and a control section that selects setting to be used for transmission control or reception control by the communication section in accordance with whether the wireless communication is non-orthogonal multiple access or orthogonal multiple access.

15 Claims, 26 Drawing Sheets

(56) References Cited

U.S. PATENT DOCUMENTS

| | | | |
|---|---|---|---|
| 2014/0050187 A1 | 2/2014 | Nakshima et al. | |
| 2015/0043540 A1* | 2/2015 | Nikopour | H04B 7/2628 370/335 |
| 2015/0312074 A1* | 10/2015 | Zhu | H04W 52/16 370/329 |
| 2015/0351081 A1* | 12/2015 | Zhu | H04J 11/003 370/329 |
| 2016/0073382 A1* | 3/2016 | Li | H04W 72/1289 370/329 |
| 2016/0219529 A1* | 7/2016 | Benjebbour | H04L 5/0091 |
| 2016/0330695 A1* | 11/2016 | Benjebbour | H04W 72/042 |
| 2018/0160372 A1* | 6/2018 | Benjebbour | H04W 52/241 |
| 2018/0376409 A1* | 12/2018 | Tani | H04W 48/10 |
| 2020/0127778 A1* | 4/2020 | Zhuang | H04W 28/0278 |
| 2021/0036831 A1* | 2/2021 | Utkovski | H04J 11/0026 |

FOREIGN PATENT DOCUMENTS

| | | | |
|---|---|---|---|
| JP | 2016-187118 A | 10/2016 | |
| JP | 6441377 B2 | 12/2018 | |
| JP | 2019-004325 A | 1/2019 | |
| KR | 10-2016-0124223 A | 10/2016 | |
| WO | 2015/167714 A1 | 11/2015 | |
| WO | 2017/077971 A1 | 5/2017 | |
| WO | 2018/230300 A1 | 12/2018 | |

OTHER PUBLICATIONS

Extended European Search Report of EP Application No. 18863433.1, dated Oct. 6, 2020, 09 pages.

"Discussion on non-orthogonal multiple access", Samsung, R1-1706119, 3GPP TSG RAN WG1, Meeting 88b, Spokane, Washington, USA, Apr. 3-7, 2017, 06 pages.

International Search Report and Written Opinion of PCT Application No. PCT/JP2018/034184, dated Dec. 34, 2018, 06 pages of ISRWO.

Intel Corporation: "Discussion on MuST UE Parameter Estimation Feasibility",3GPP Draft, R4-165046, Mobile Competence Centre; 650, Route Des Lucioles, F-06921 Sophia-Antipolis Cedex ; France,vol. RAN WG4, no. Gothenburg, Sweden; Aug. 22, 2016-Aug. 26, 2016, Aug. 22-26, 2016, XP051127824,Retrieved from the Internet: URL:http://www.3gpp.org/ftp/Meetings_3GPP SYNC/RAN4/Docsl [retrieved on Aug. 21, 2016].

Office Action for EP Patent Application No. 18863433.1, dated Dec. 2, 2021, 07 pages of Office Action.

Office Action for IN Patent Application No. 202017012116, dated Mar. 16, 2022, 07 pages of Office Action.

"Discussion on non-orthogonal multiple access", Samsung, 3GPP TSG RAN WG1, 88b Meeting, R1-1706119, Spokane, Washington, USA, Apr. 3-7, 2017, 6 pages.

Office Action for JP Patent Application No. 2019-544589, dated May 31, 2022, 05 pages of English Translation and 05 pages of Office Action.

* cited by examiner

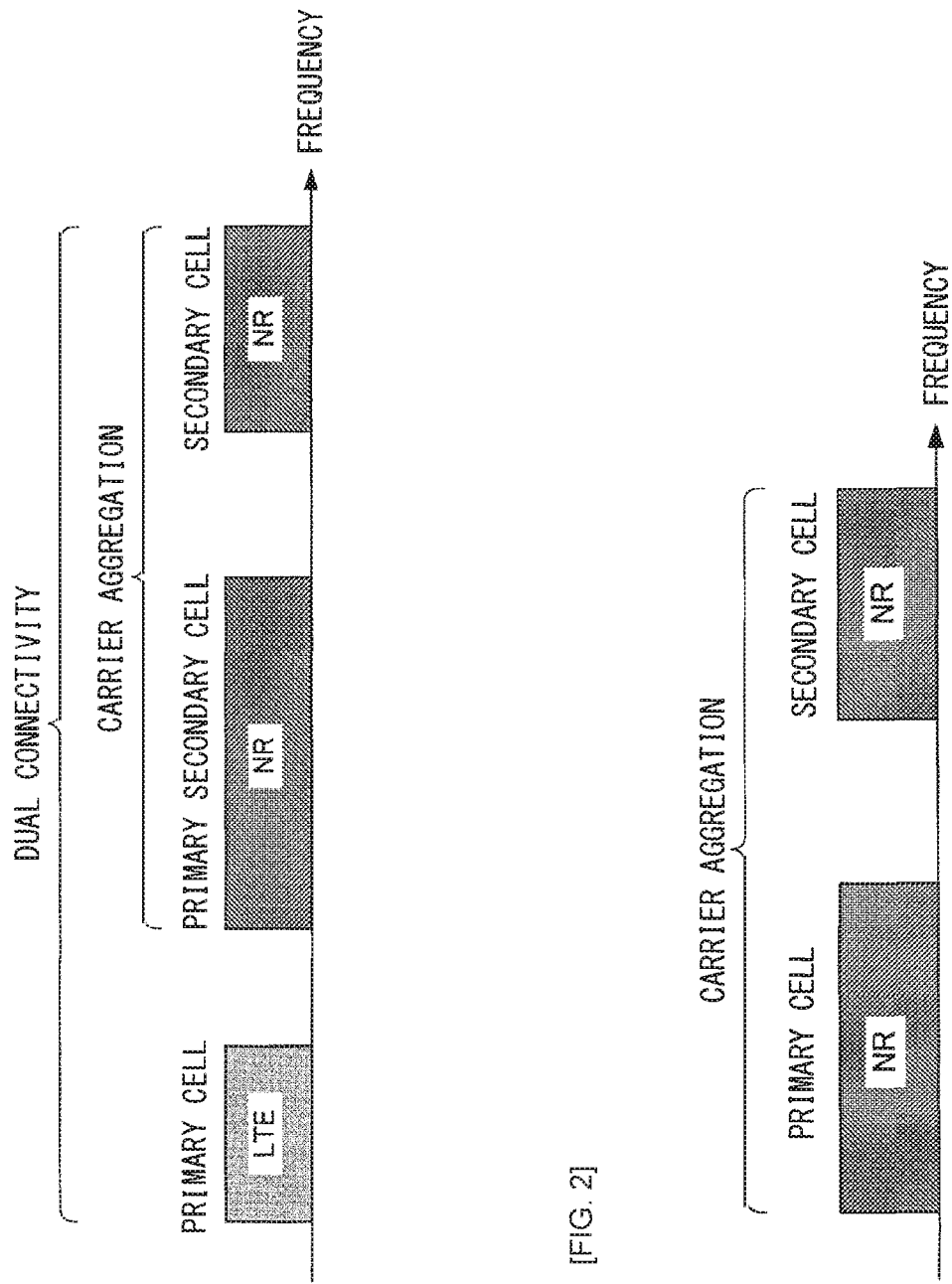

[FIG. 3]

| | SUBCARRIER INTERVAL | MAXIMUM BANDWIDTH OF COMPONENT CARRIER | CP LENGTH TYPE | NUMBER OF SYMBOLS PER SUBFRAME | SUBFRAME LENGTH | WIRELESS FRAME LENGTH | NUMBER OF SUBCARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

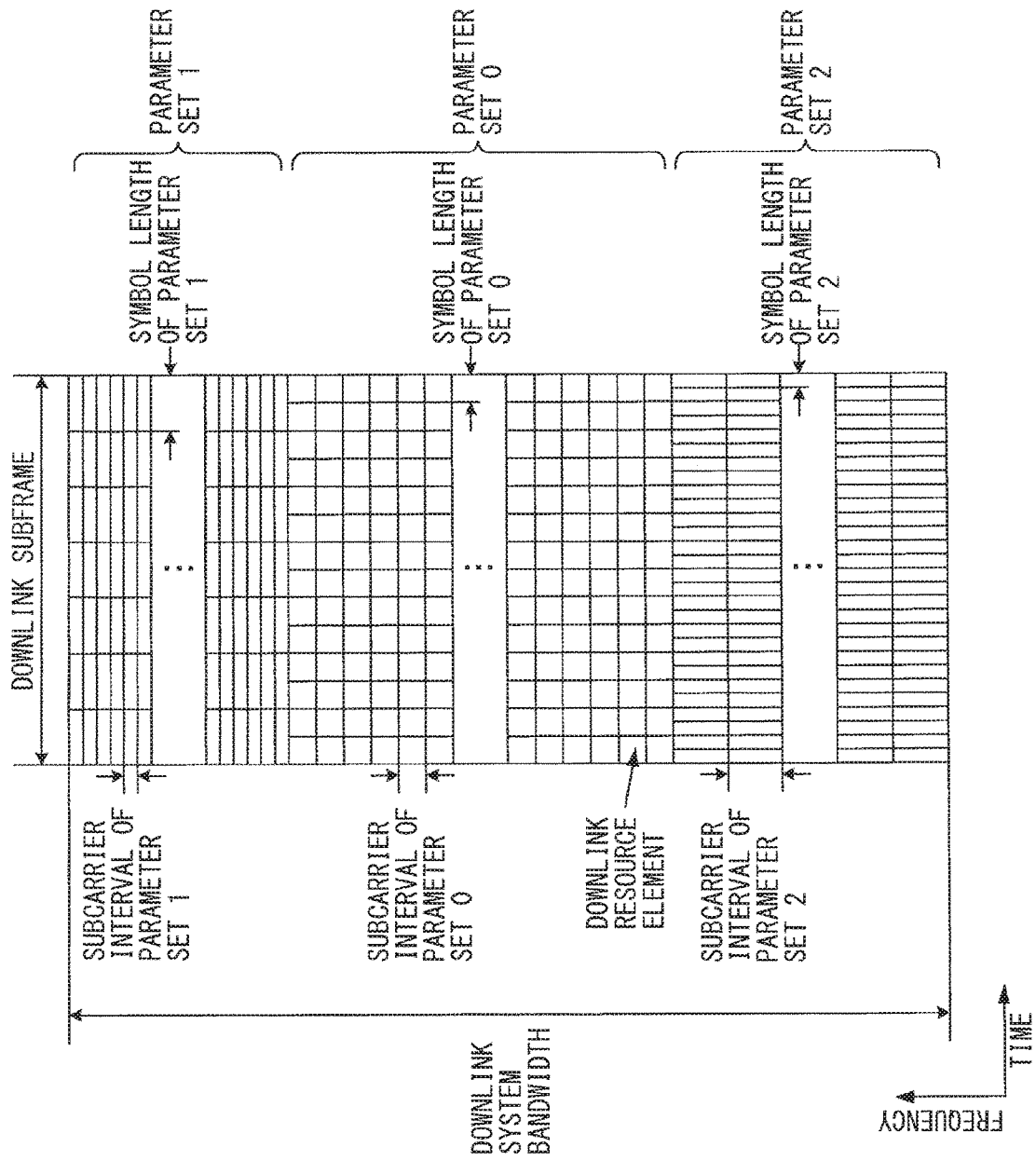
[FIG. 4]

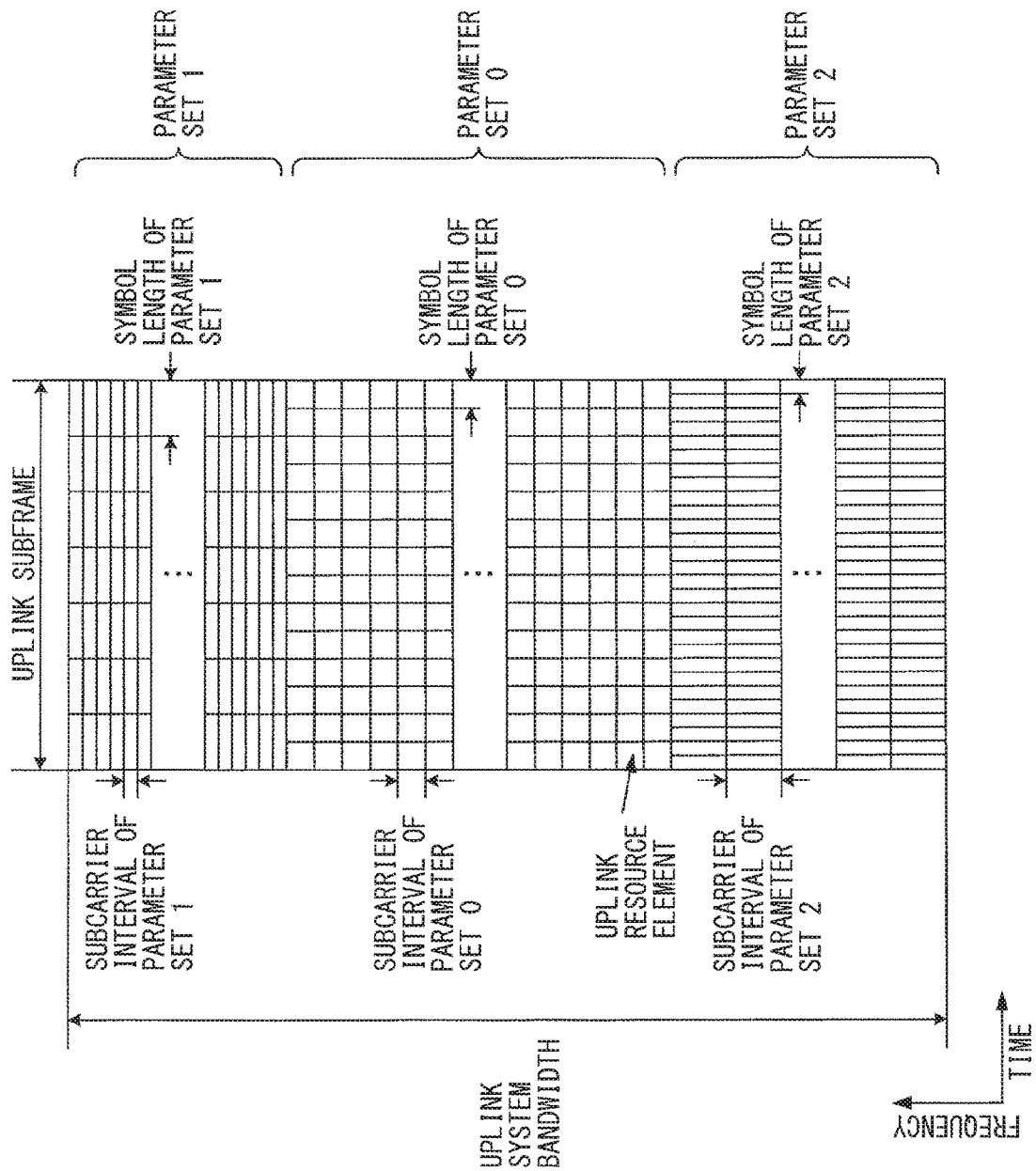
[FIG. 5]

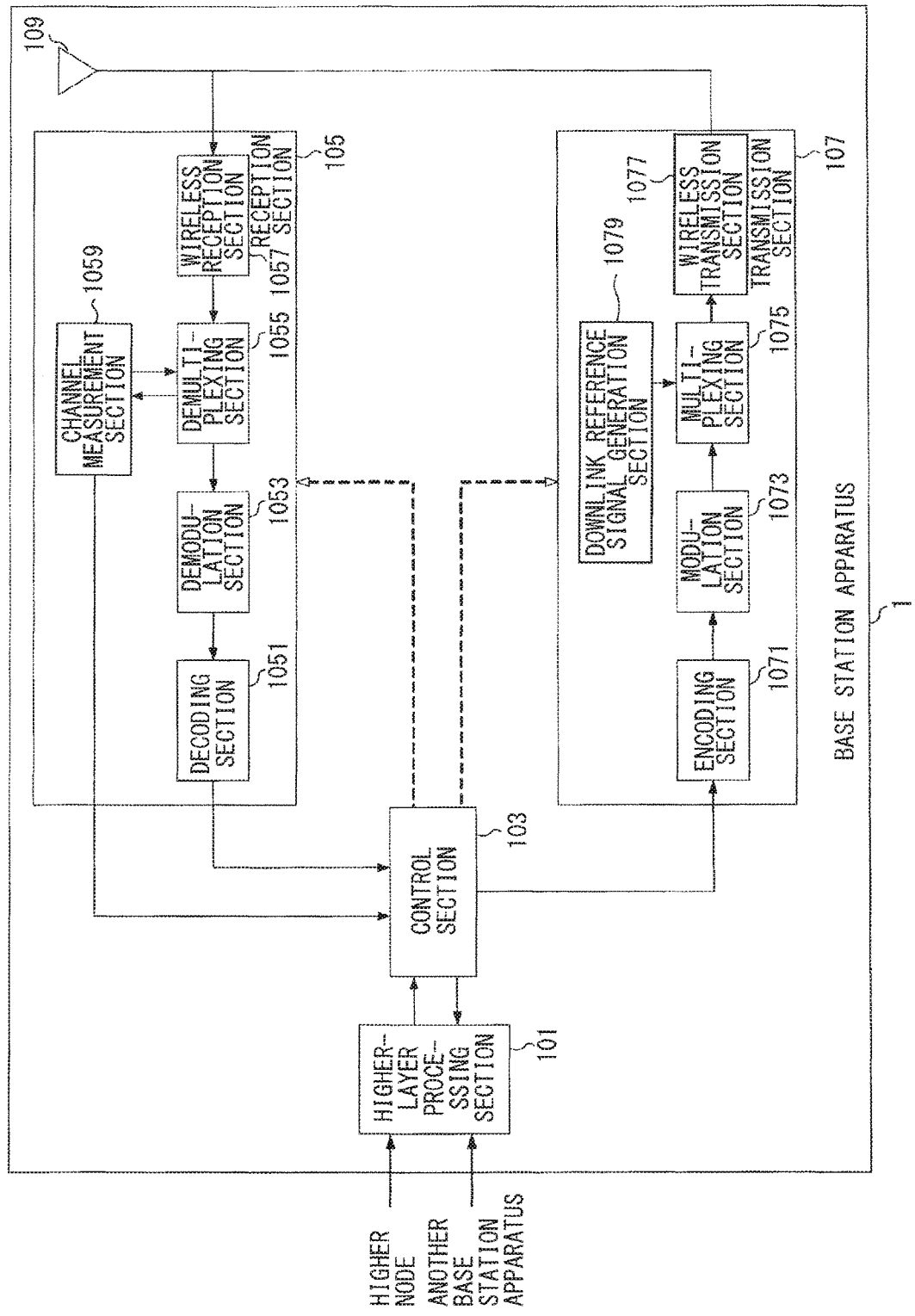
[FIG. 6]

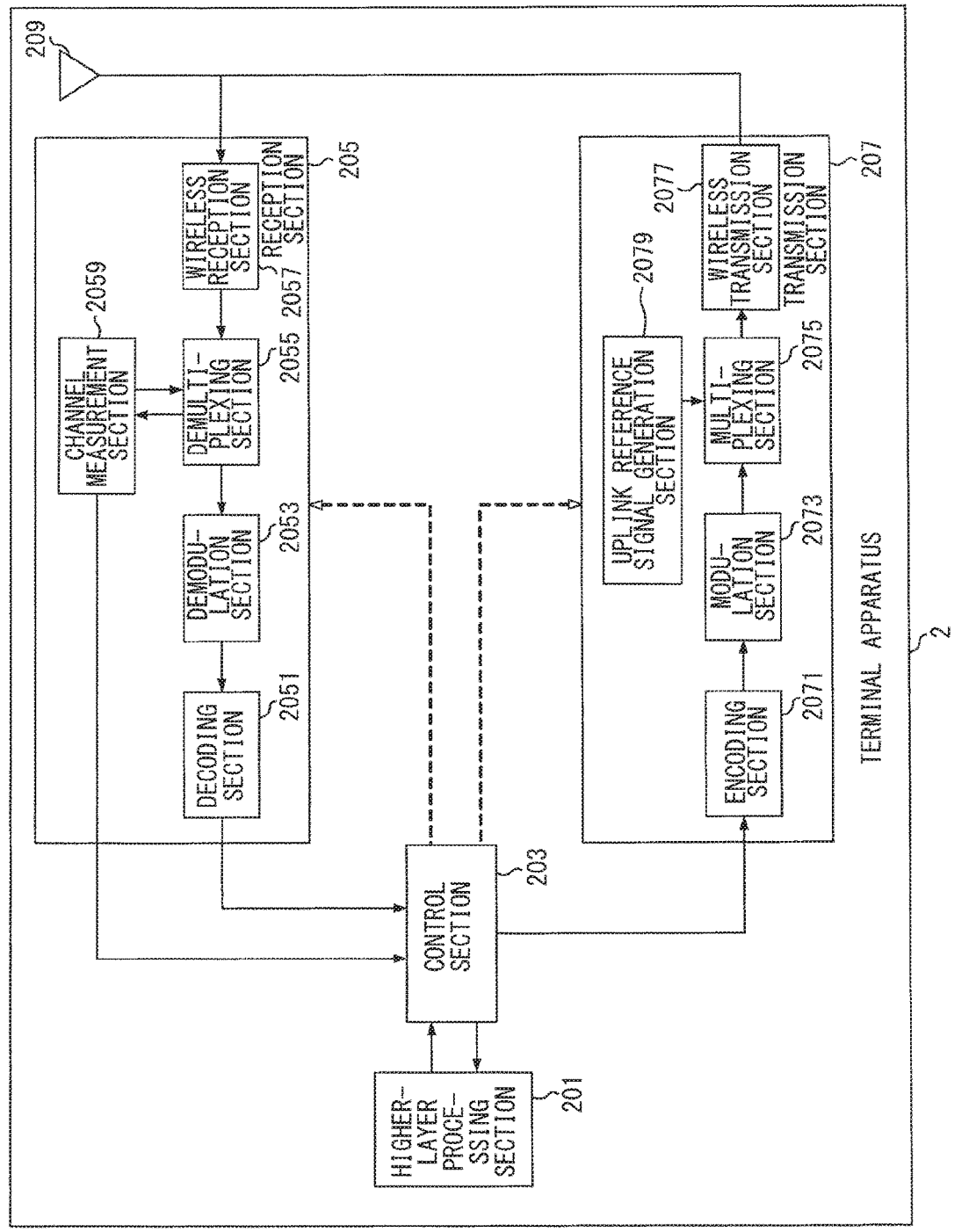
[FIG. 7]

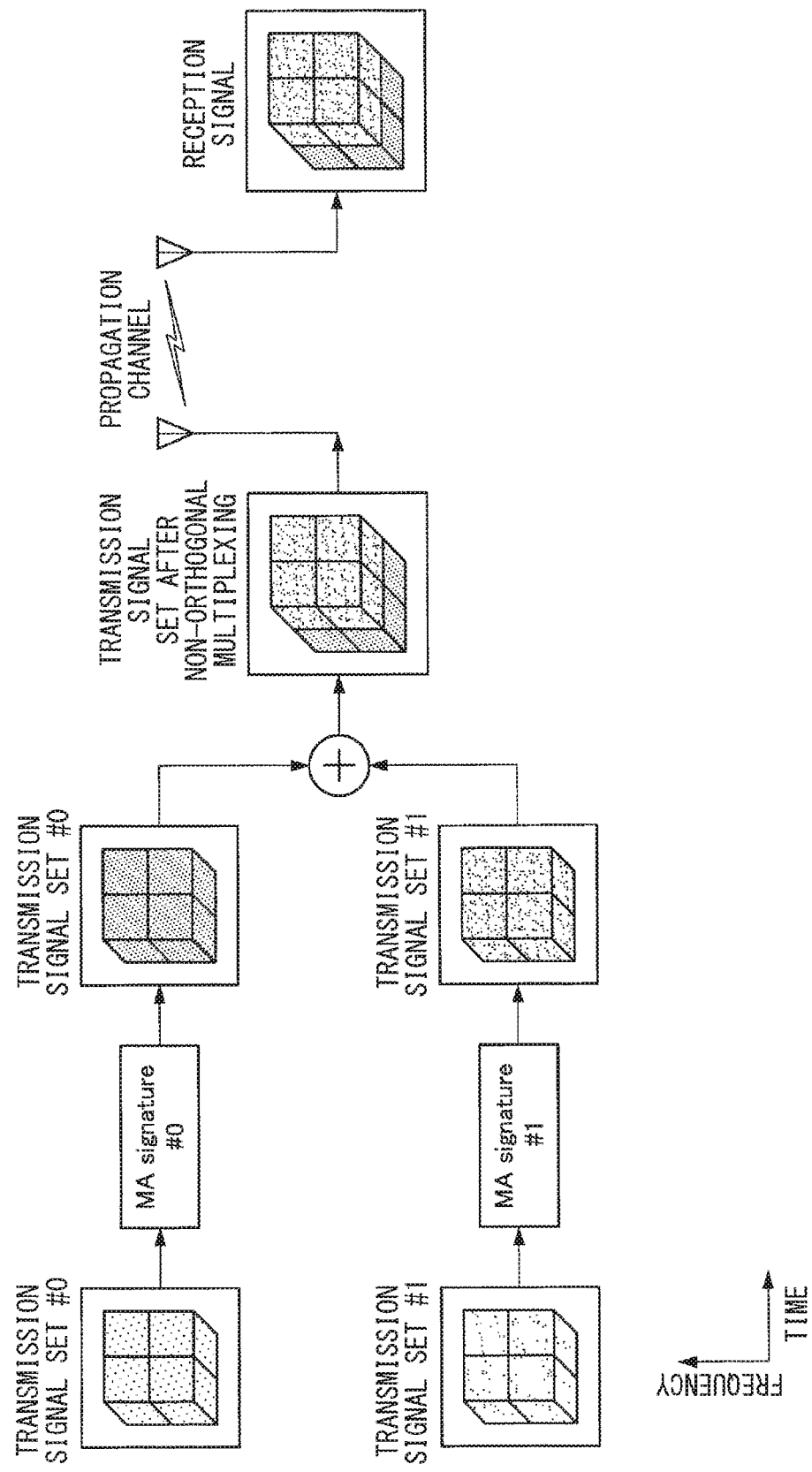

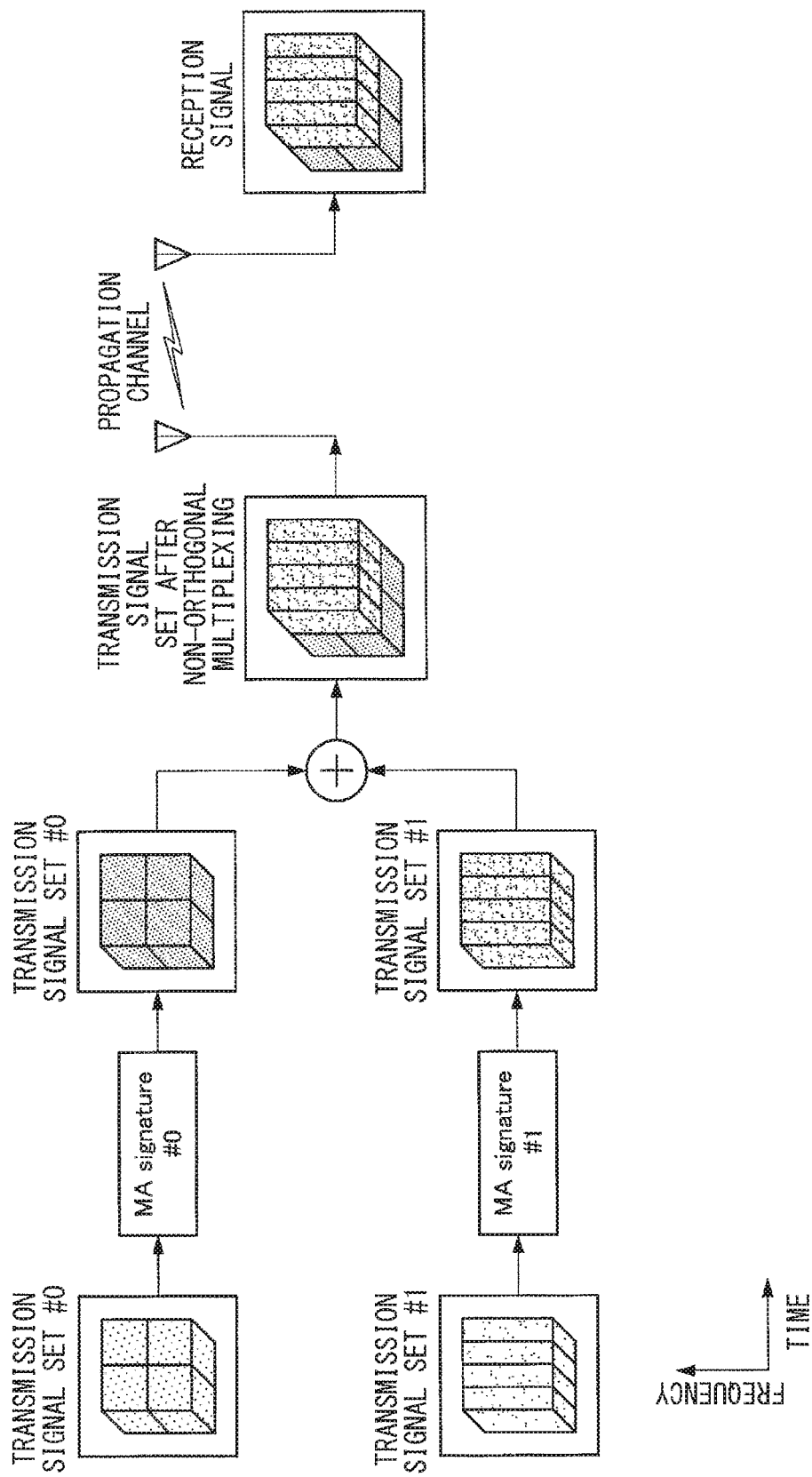

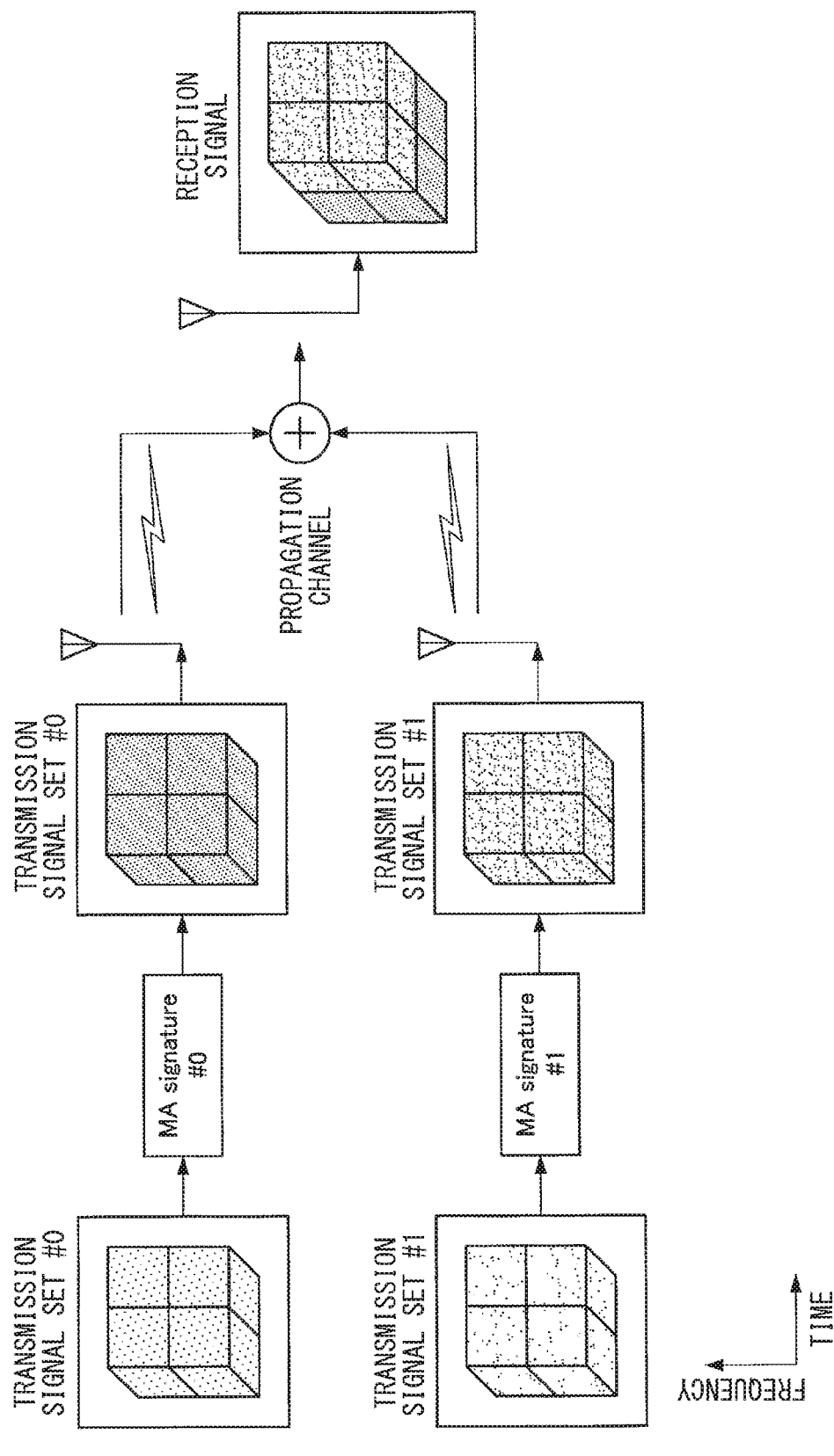
[FIG. 10]

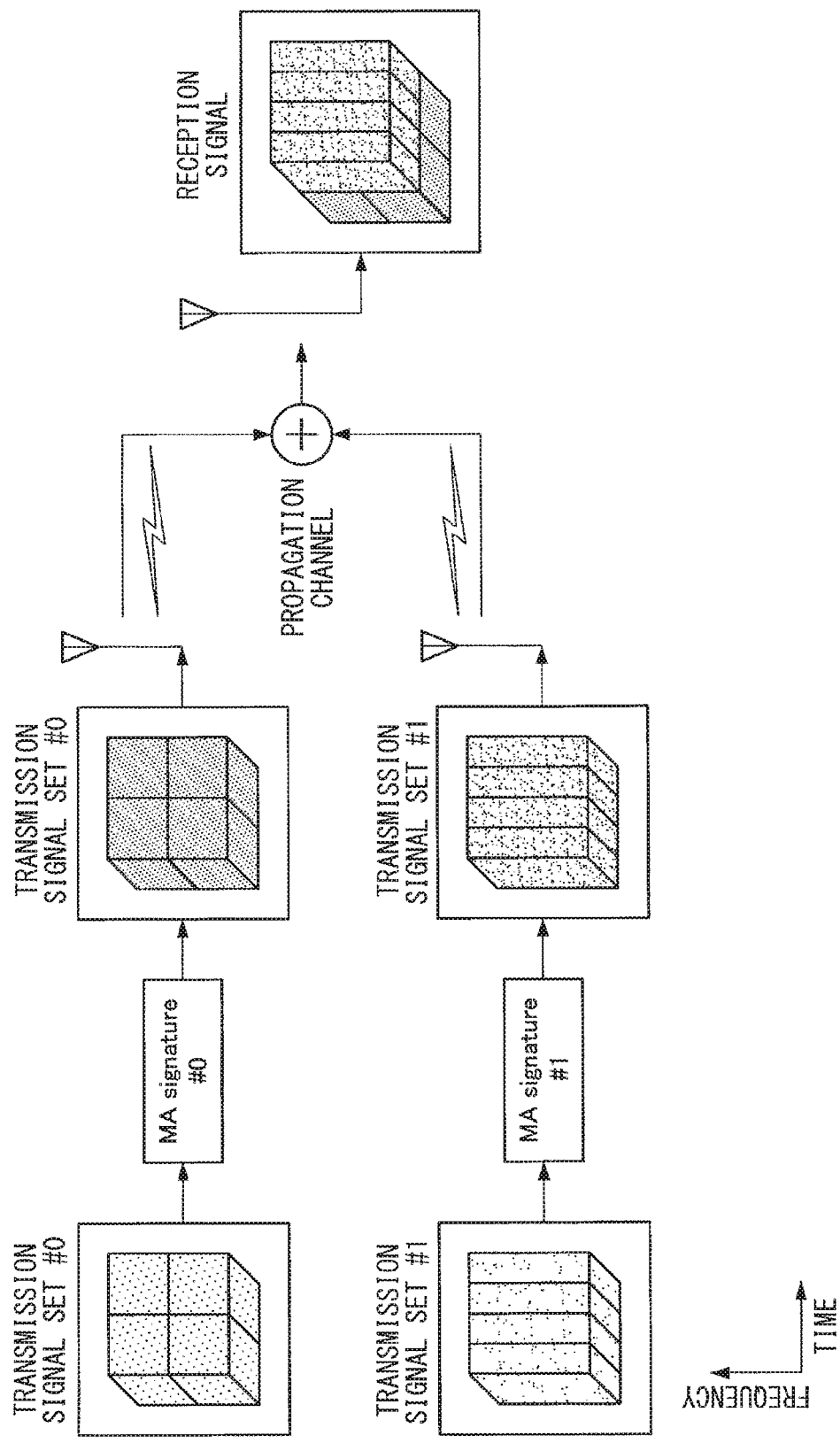
[FIG. 11]

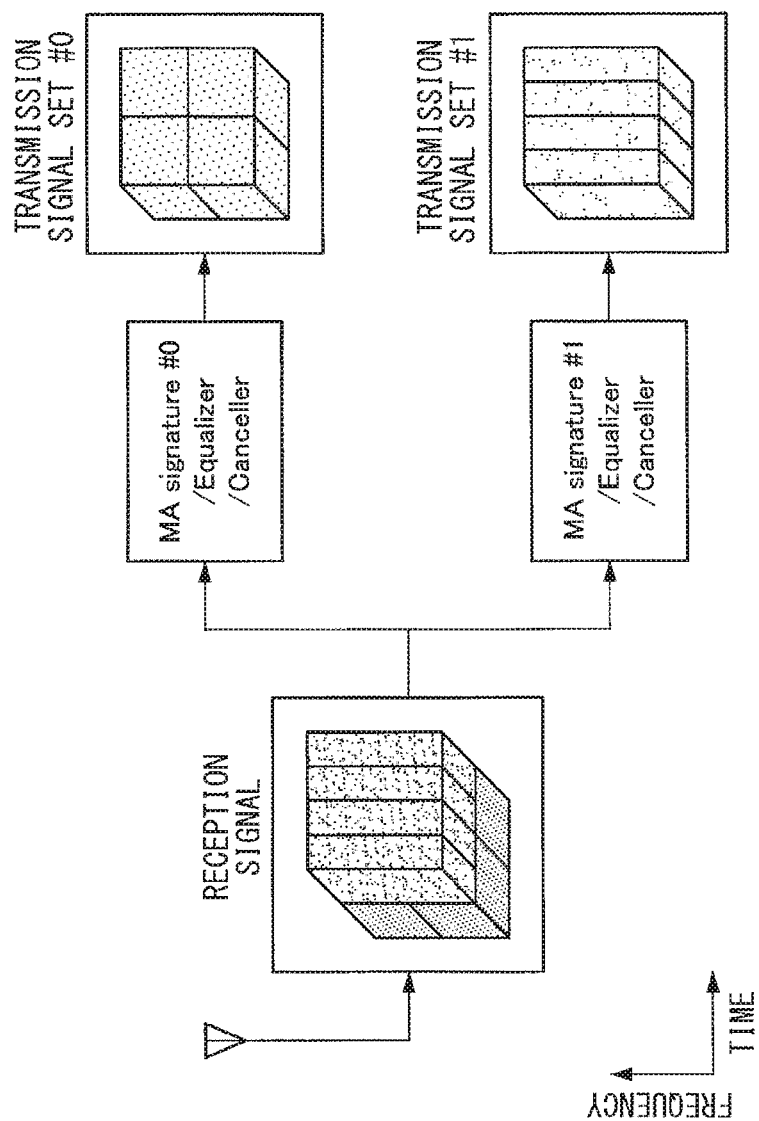
[FIG. 12]

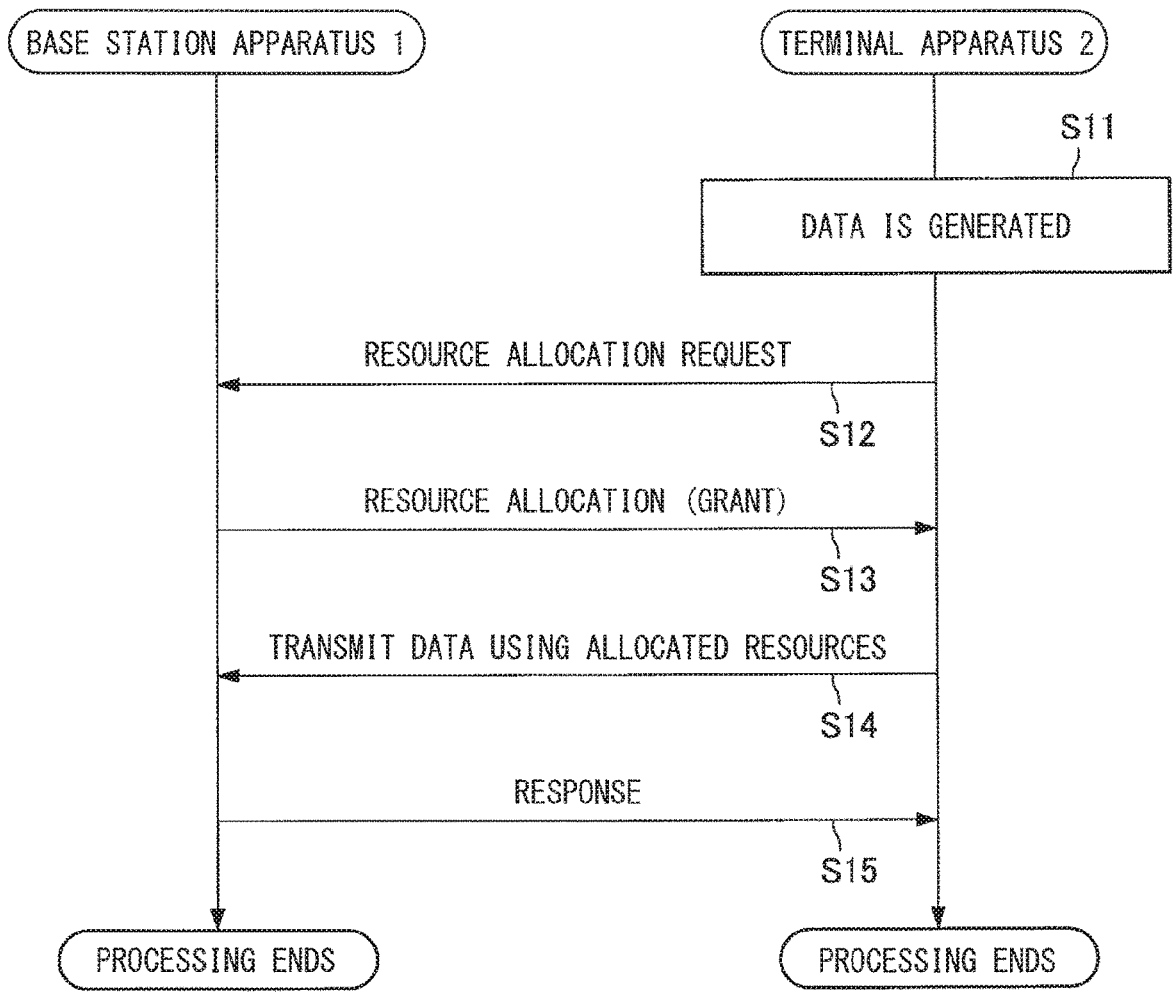
[FIG. 13]

[FIG. 14]
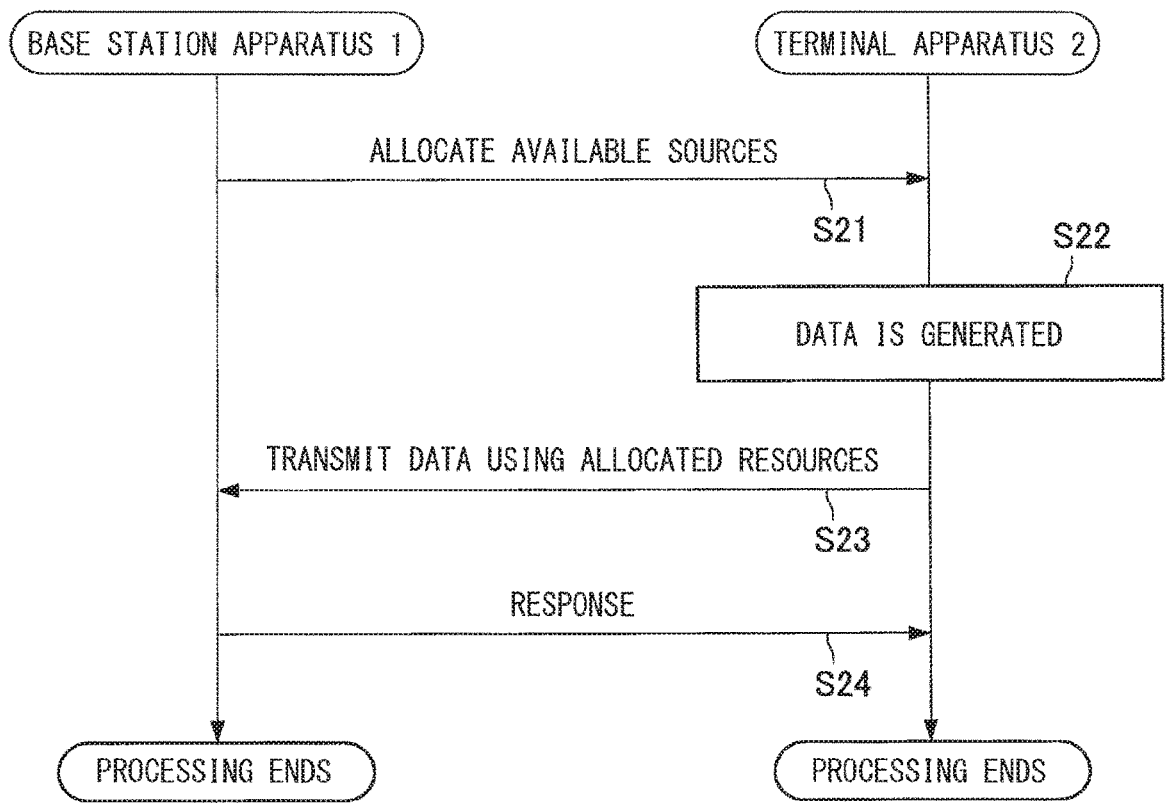
[FIG. 15]
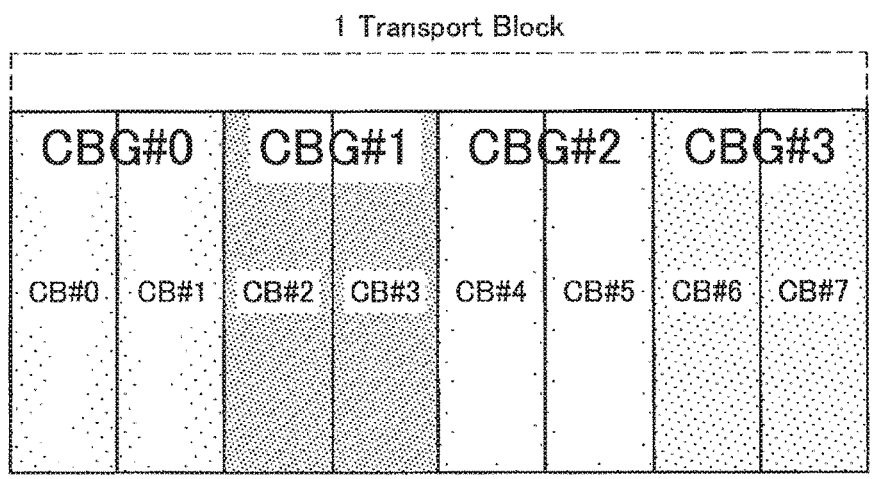

[FIG. 16]
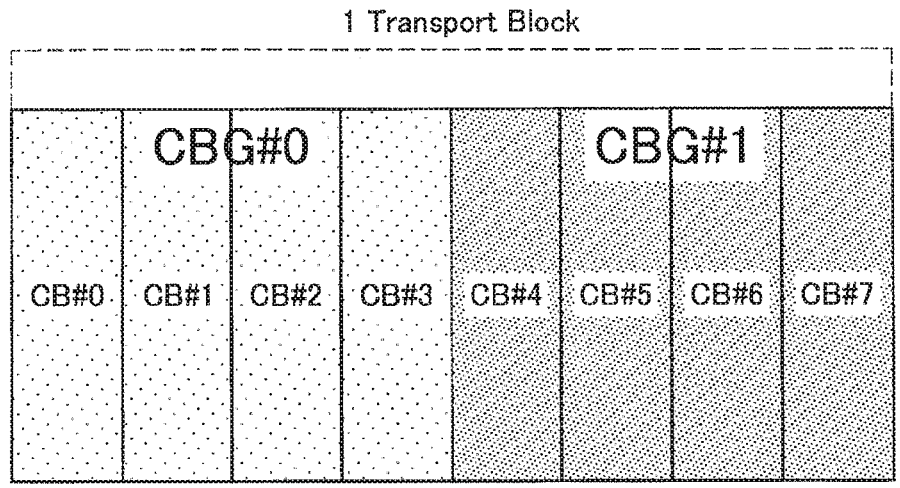
[FIG. 17]
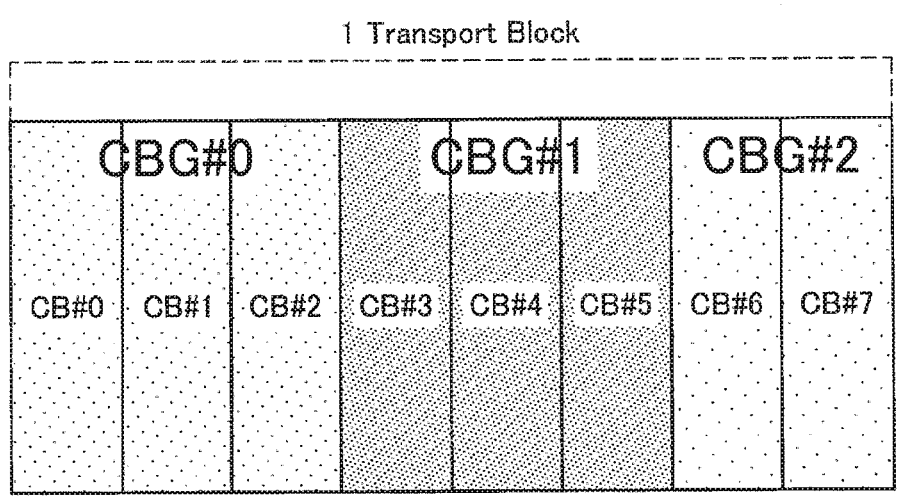
[FIG. 18]
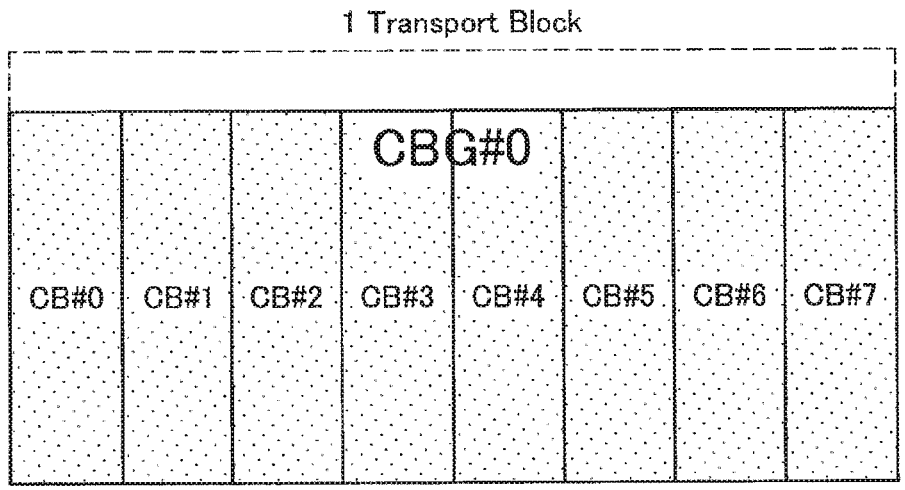

[FIG. 19A]
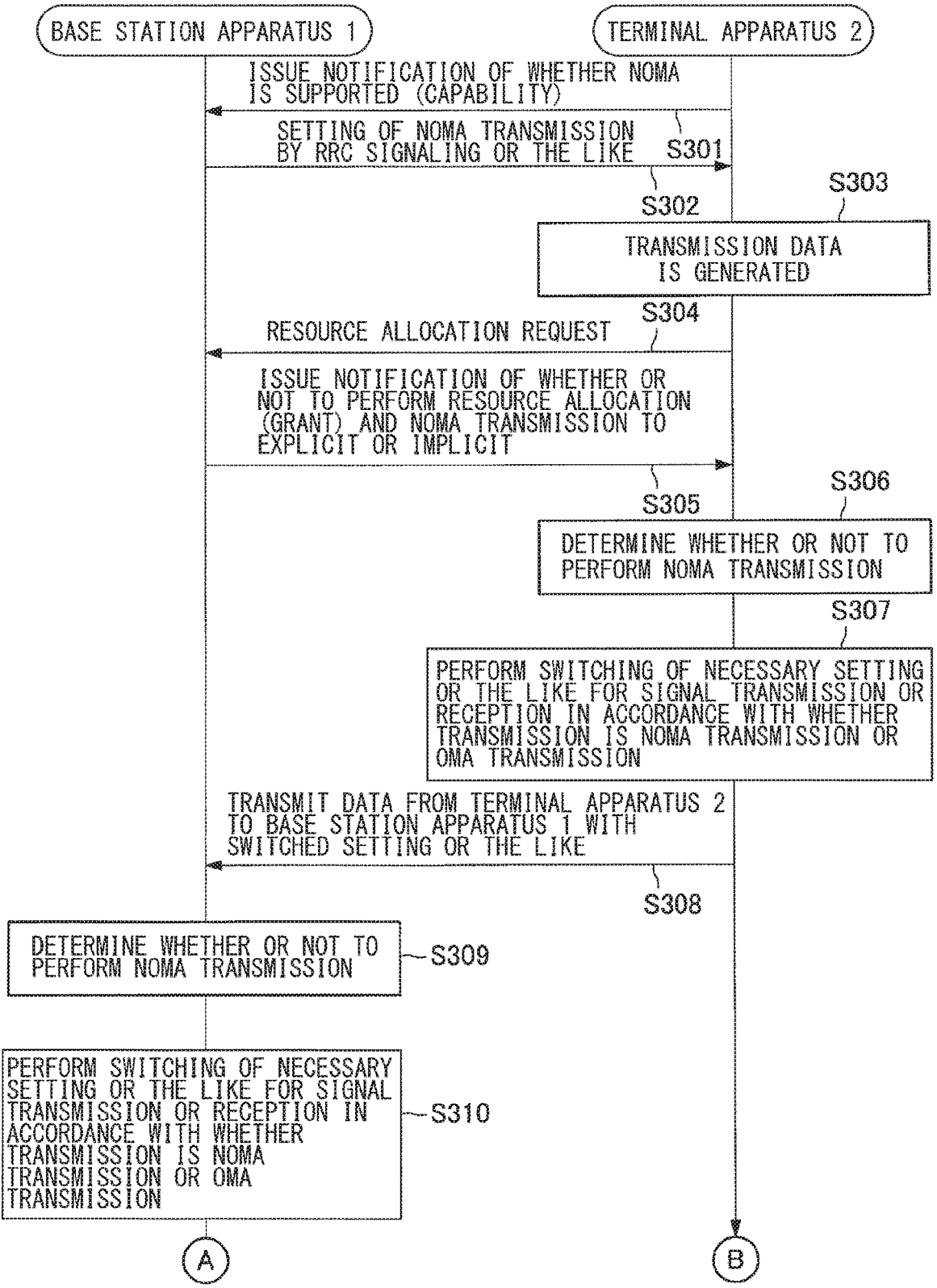

[FIG. 19B]
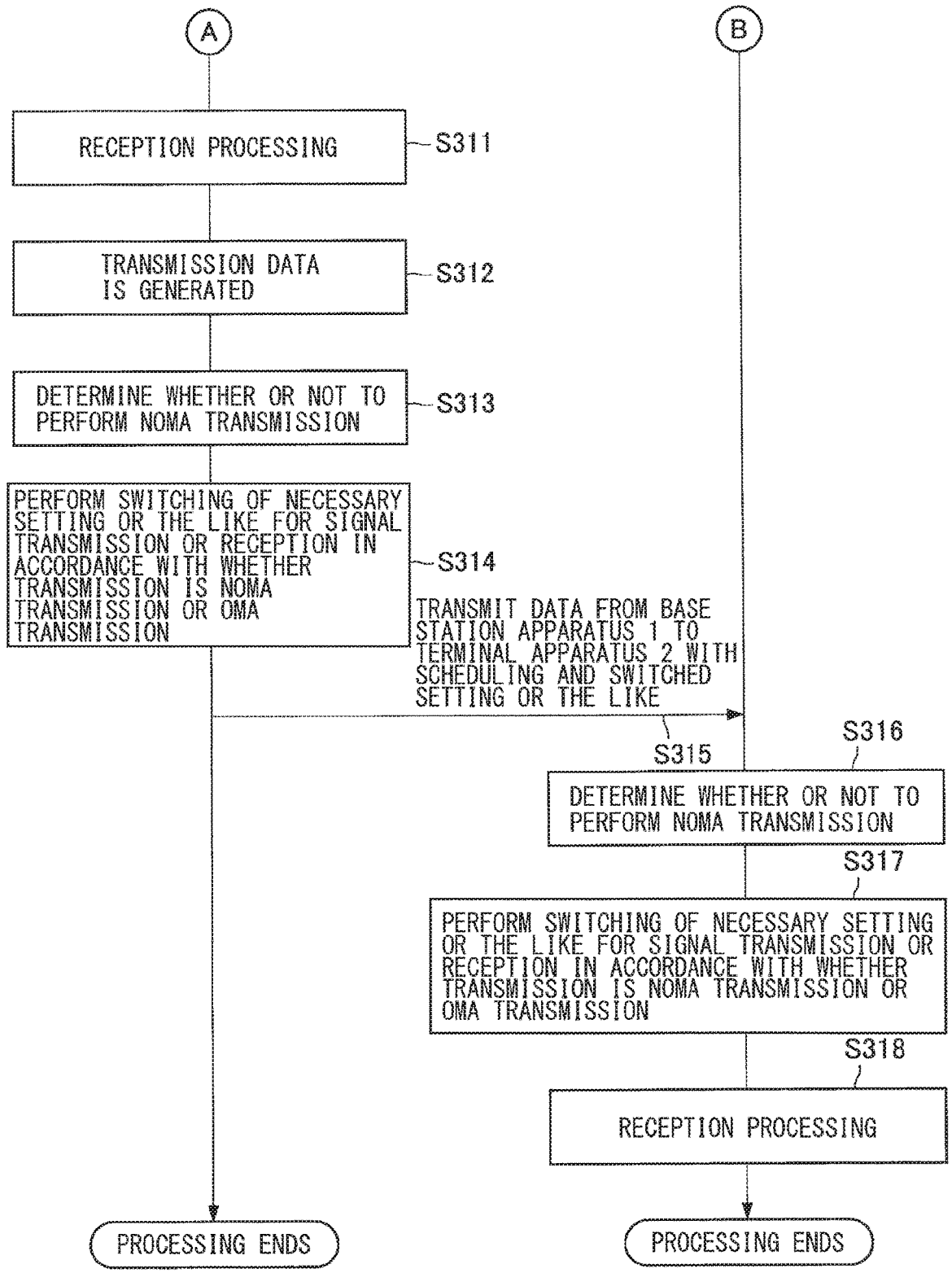

[FIG. 20]
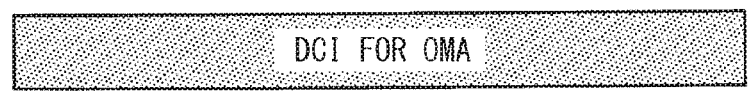
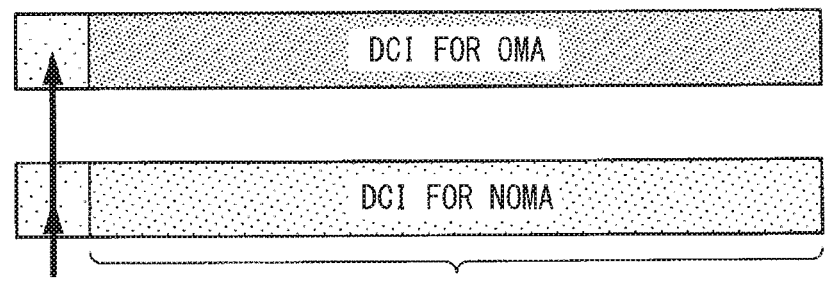

[FIG. 21]
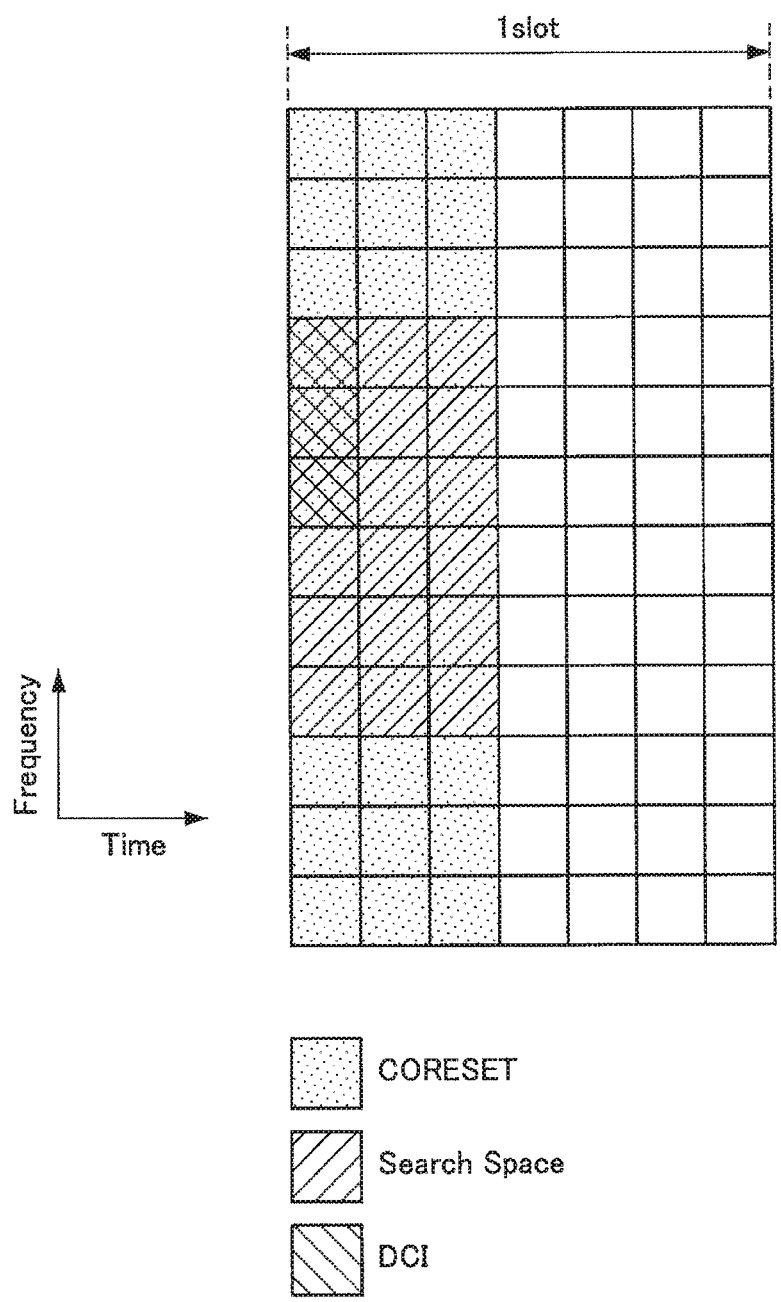

[FIG. 22]
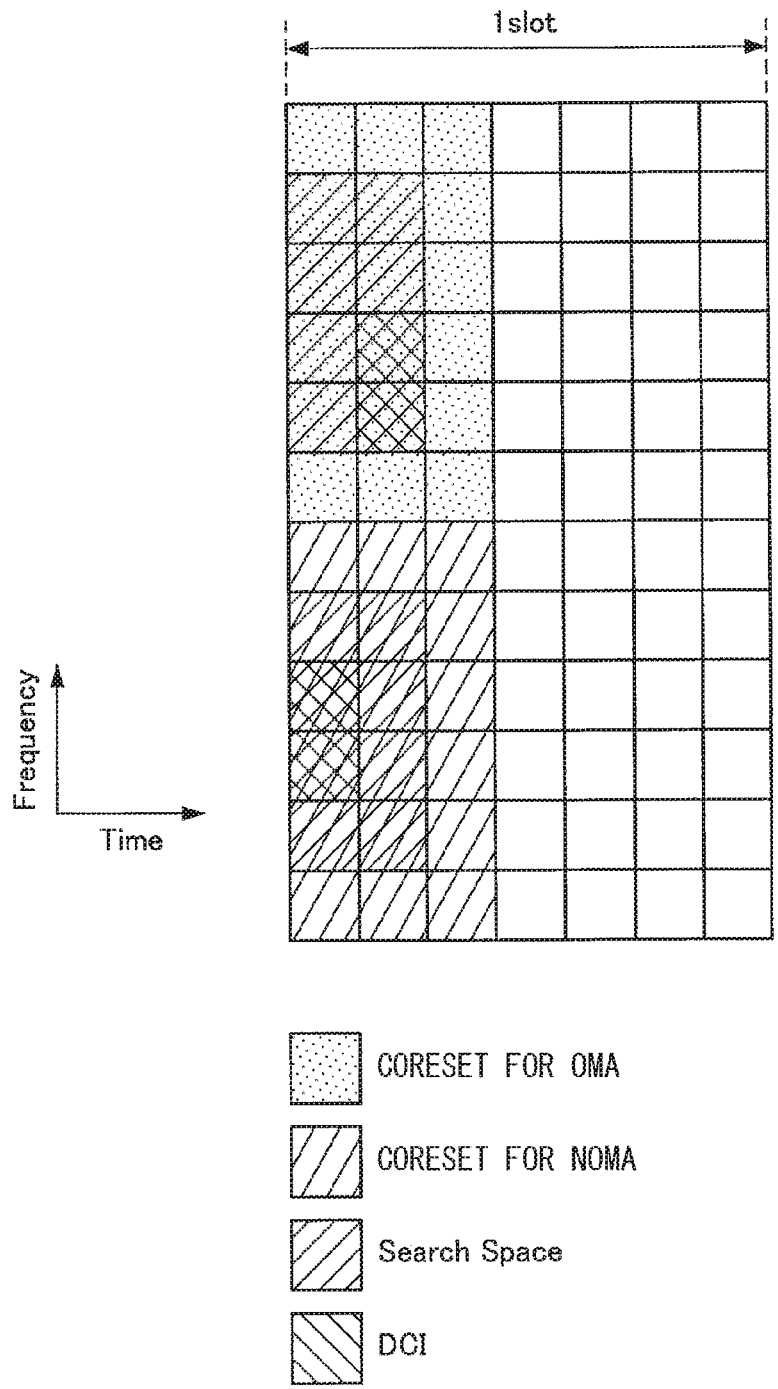

[FIG. 23]
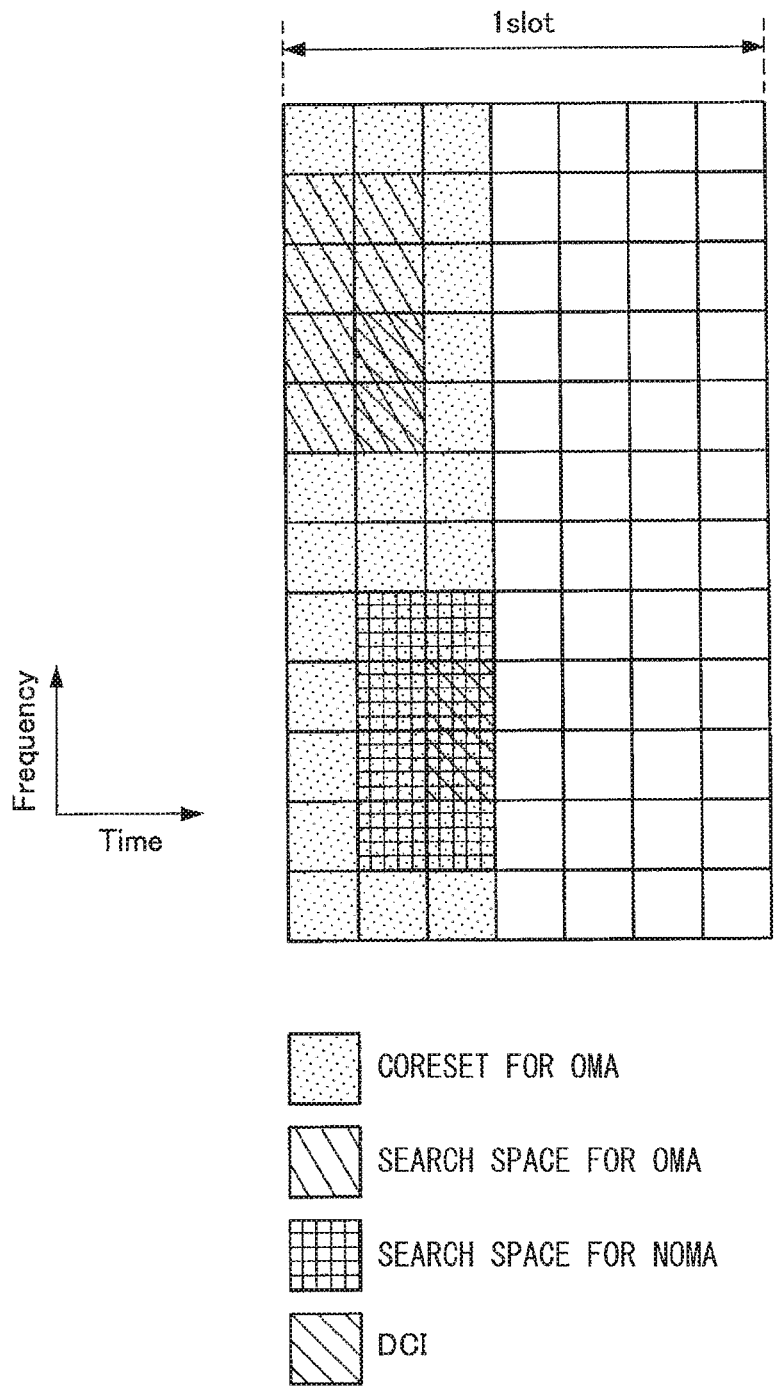

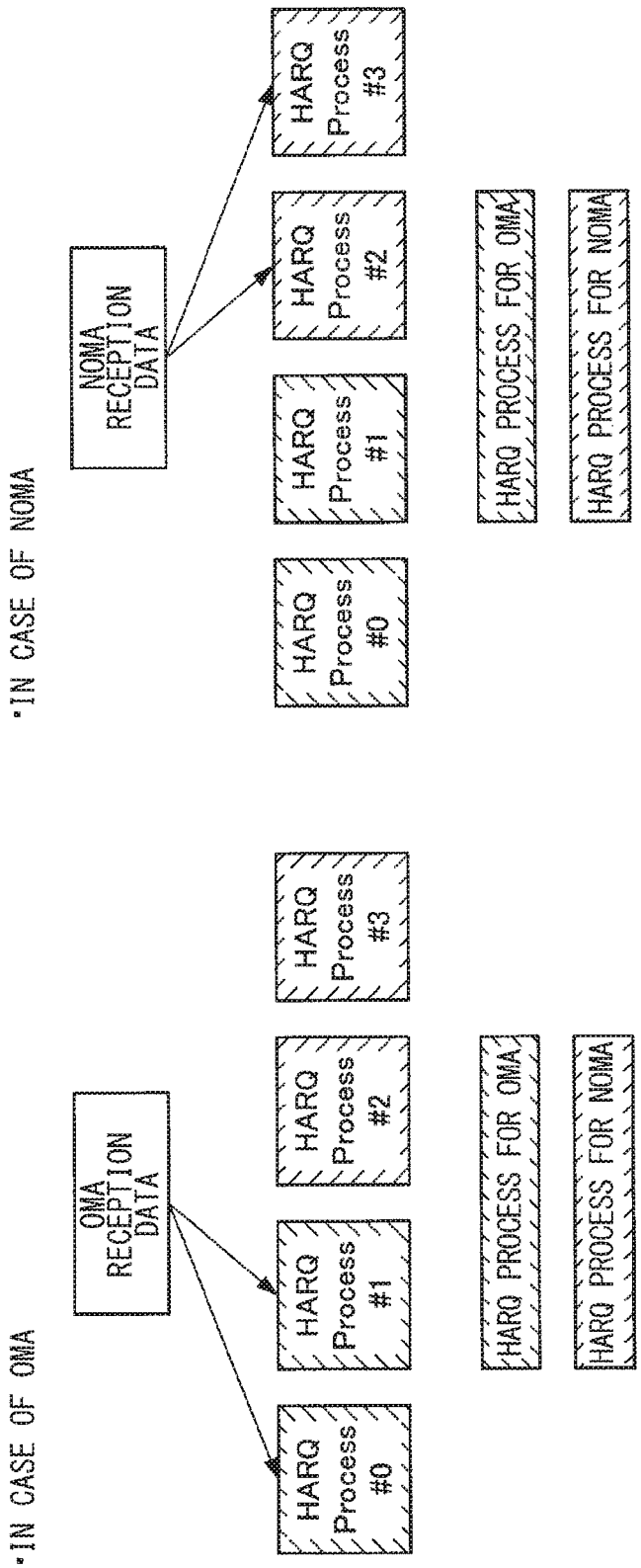
[FIG. 24]

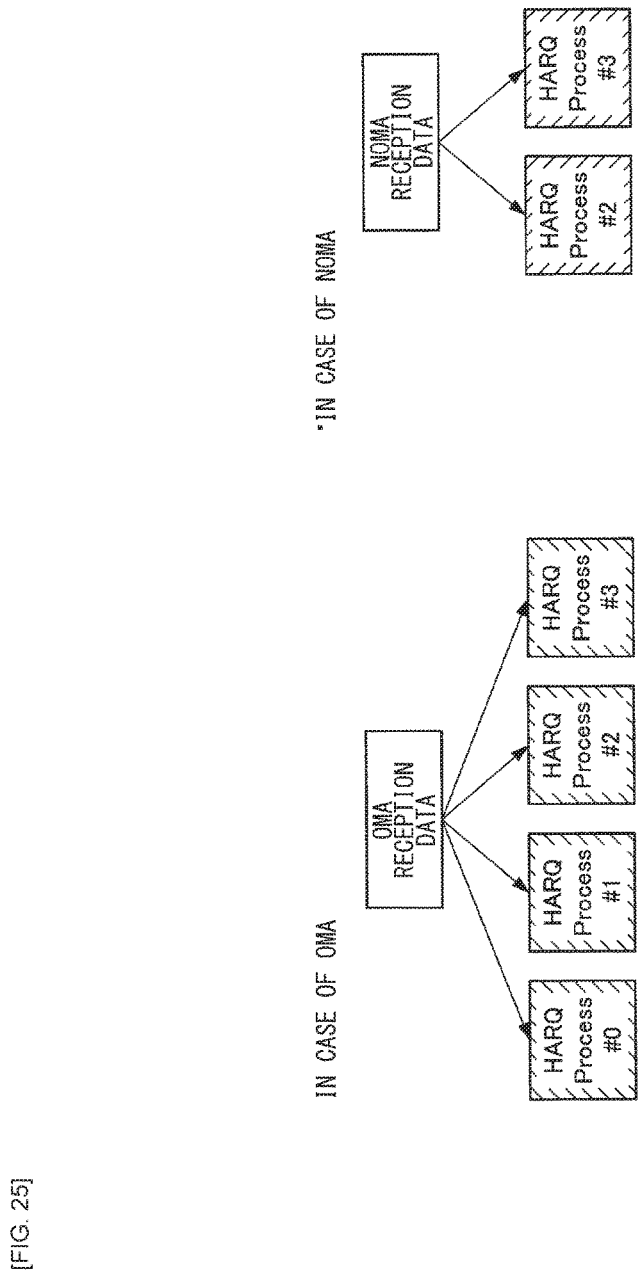
[FIG. 25]

[FIG. 26]
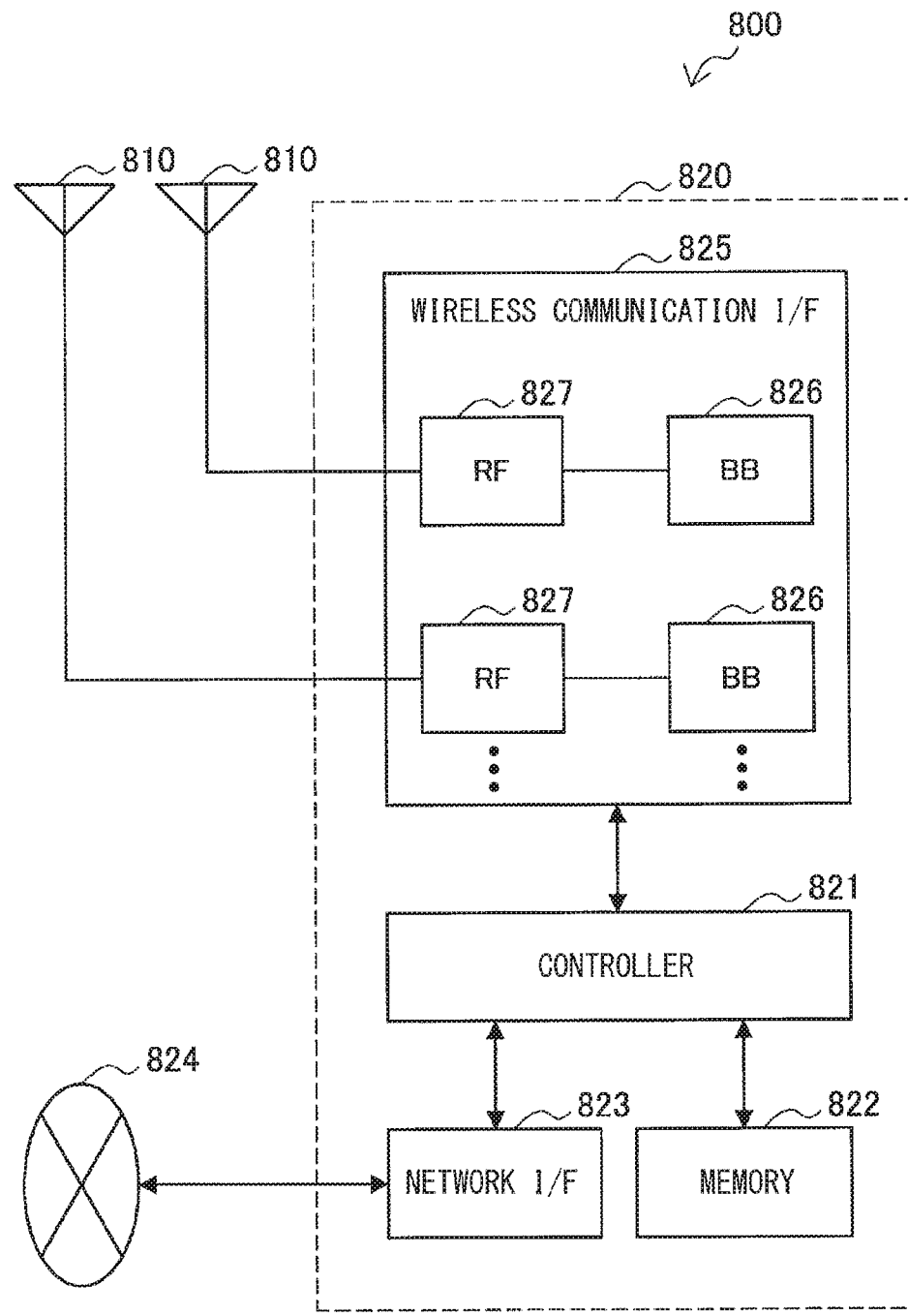

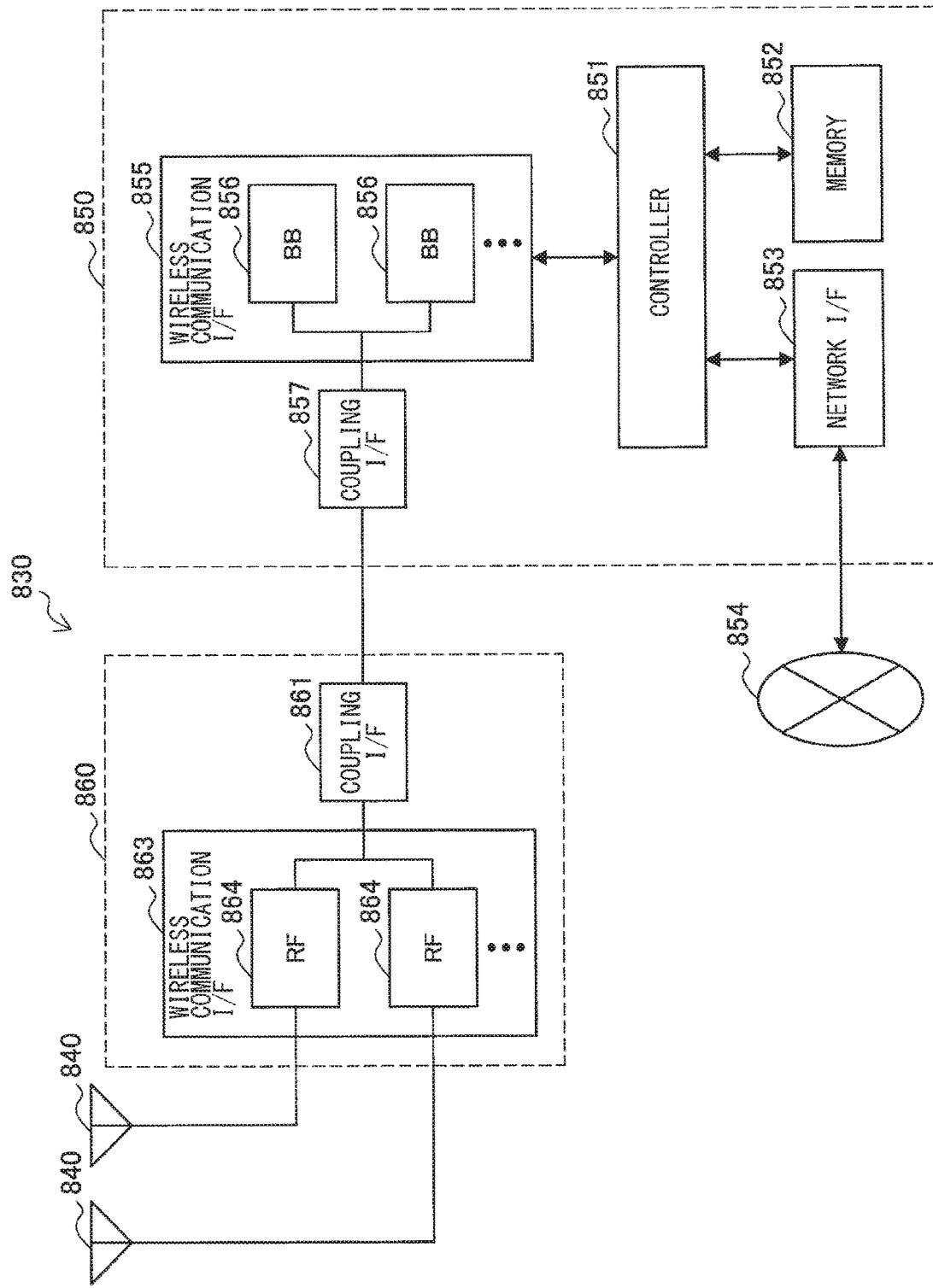
[FIG. 27]

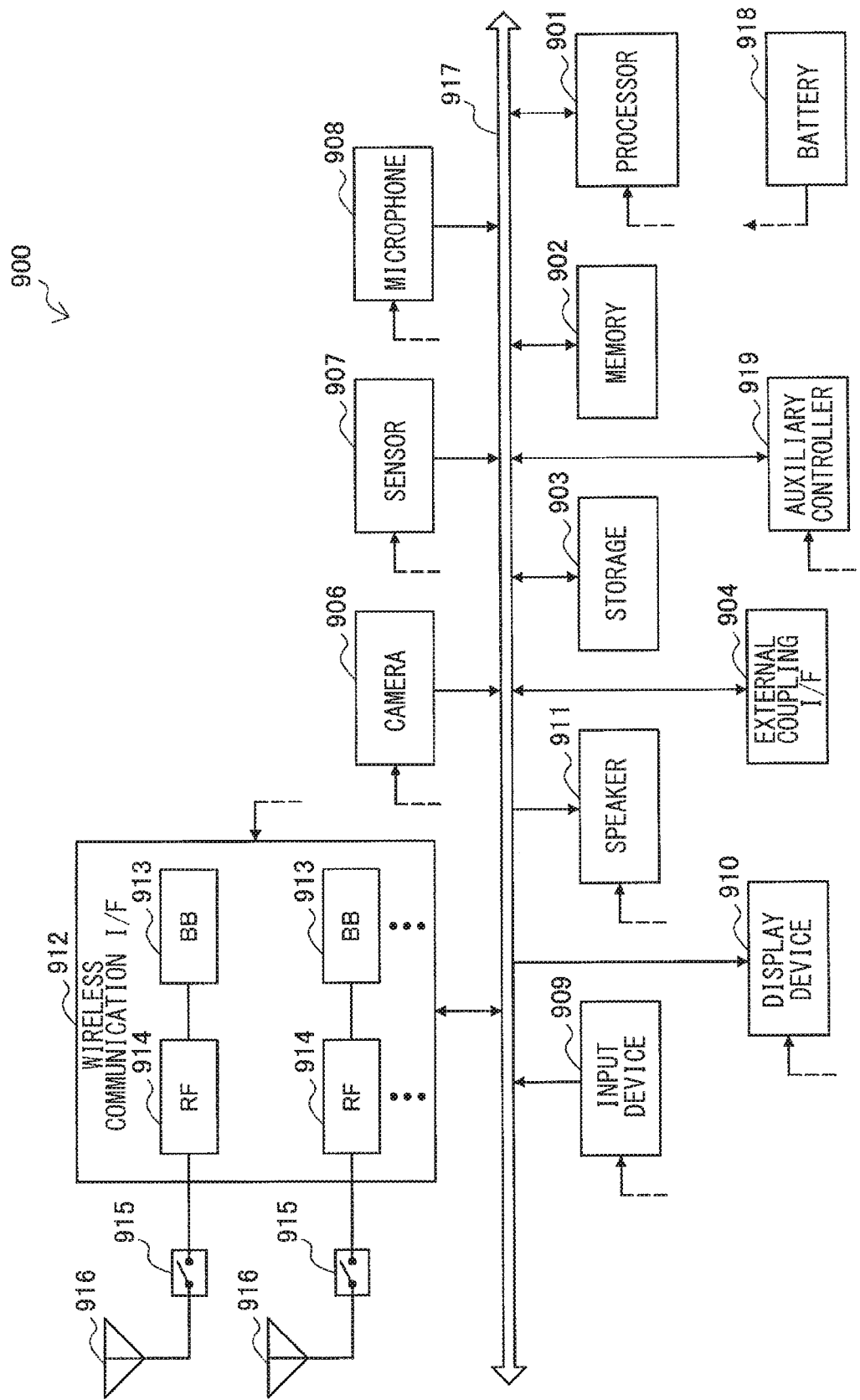

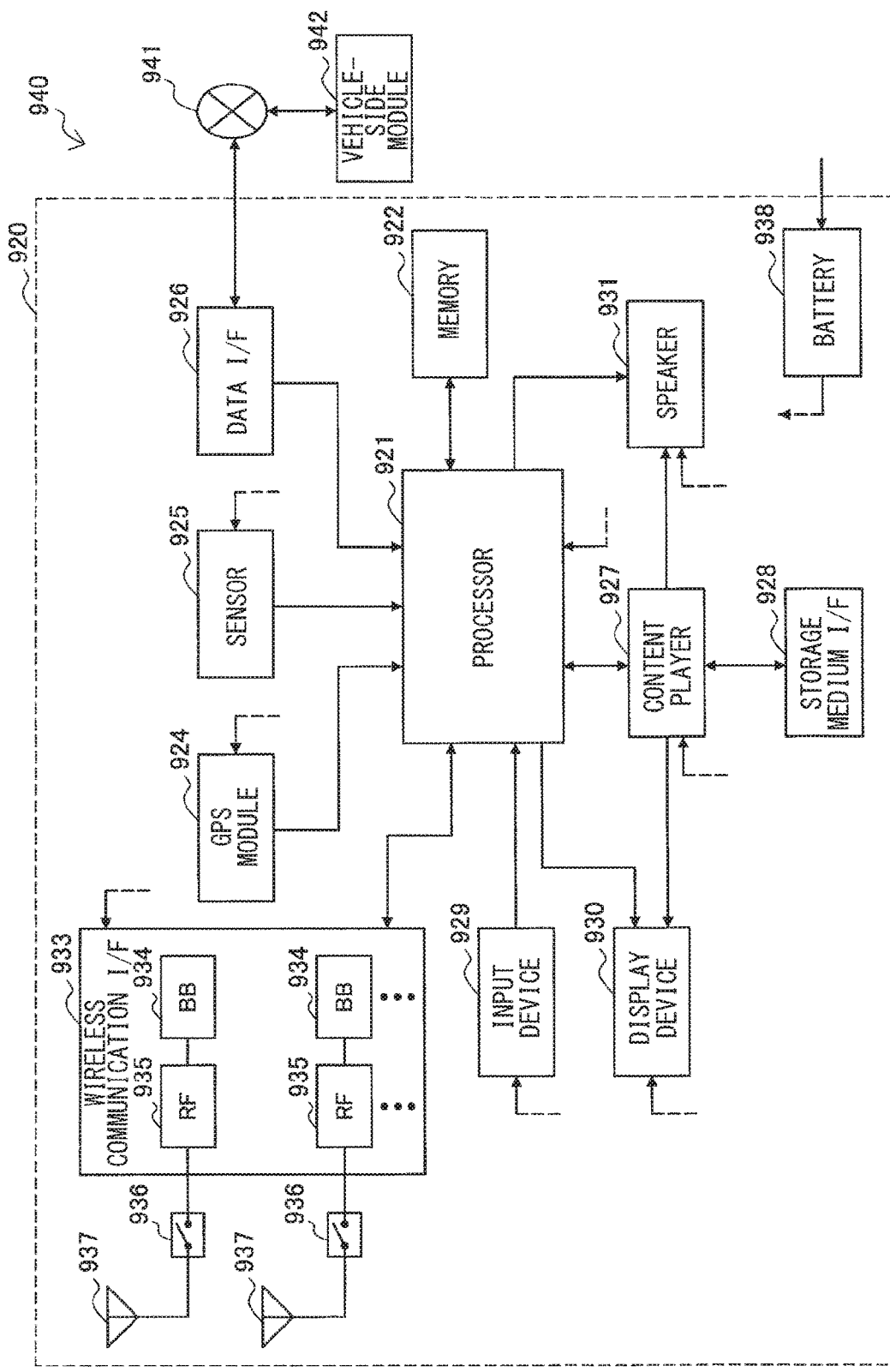
[FIG. 29]

WIRELESS COMMUNICATION APPARATUS AND WIRELESS COMMUNICATION METHOD

CROSS REFERENCE TO RELATED APPLICATIONS

This application is a U.S. National Phase of International Patent Application No. PCT/JP2018/034184 filed on Sep. 14, 2018, which claims priority benefit of Japanese Patent Application No. JP 2017-189613 filed in the Japan Patent Office on Sep. 29, 2017. Each of the above-referenced applications is hereby incorporated herein by reference in its entirety.

TECHNICAL FIELD

The present disclosure relates to a wireless communication apparatus, a wireless communication method, and a computer program.

BACKGROUND ART

Wireless access schemes and wireless networks for cellular mobile communication (that are also referred to as "Long Term Evolution (LTE)," "LTE-Advanced (LTE-A)," "LTE-Advanced Pro (LTE-A Pro)," "New Radio (NR)," "New Radio Access Technology (NRAT)," "Evolved Universal Terrestrial Radio Access (EUTRA)," or "Further EUTRA (FEUTRA)") have been under consideration in the Third Generation Partnership Project (3rd Generation Partnership Project: 3GPP). It should be noted that, in the following description, LTE includes LTE-A, LTE-A Pro, and EUTRA, and NR includes fifth generation mobile wireless communications (5G), NRAT, and FEUTRA. In LTE and NR, a base station apparatus (base station) is also referred to as eNodeB (evolved NodeB) or gnodeB (gNB), and a terminal apparatus (mobile station, mobile station apparatus, and terminal) is also referred to as UE (User Equipment). LTE and NR are cellular communication systems in which a plurality of areas covered by base station apparatuses are disposed as cells. A single base station apparatus may manage a plurality of cells.

NR is RAT (Radio Access Technology) that differs from LTE, as a next-generation radio access scheme for LTE. NR is an access technology that is able to support a variety of use cases including eMBB (Enhanced mobile broadband), mMTC (Massive machine type communications), and URLLC (Ultra reliable and low latency communications). NR is under consideration for technical frameworks that support usage scenarios, requirements, deployment scenarios, and the like in the use cases. One of technologies under consideration in NR is Non-Orthogonal Multiple Access (NOMA). This is a technology for improving frequency use efficiency with use of a non-orthogonal resource in addition to an orthogonal resource, and is disclosed in NPL 1.

SUMMARY OF THE INVENTION

Problems to be Solved by the Invention

As described above, in NR, in order to support a variety of use cases, it is desired to achieve communication having higher frequency use efficiency than that in LTE.

Accordingly, the present disclosure proposes a novel and improved wireless communication apparatus, wireless communication method, and computer program that allow for further improvement in transmission efficiency of an entire system.

Means for Solving the Problems

According to the present disclosure, there is provided a wireless communication apparatus including: a communication section that performs wireless communication; and a control section that selects setting to be used for transmission control or reception control by the communication section in accordance with whether the wireless communication is non-orthogonal multiple access or orthogonal multiple access.

In addition, according to the present disclosure, there is provided a wireless communication method to be executed by a processor, the method including: performing wireless communication; and switching setting to be used for transmission control or reception control in the wireless communication in accordance with whether the wireless communication is non-orthogonal multiple access or orthogonal multiple access.

Further, according to the present disclosure, there is provided a computer program that causes a computer to execute: performing wireless communication; and switching setting to be used for transmission control or reception control in the wireless communication in accordance with whether the wireless communication is non-orthogonal multiple access or orthogonal multiple access.

Effects of the Invention

As described above, according to the present disclosure, it is possible to provide the novel and improved wireless communication apparatus, wireless communication method, and computer program that allow for further improvement in transmission efficiency of an entire system.

It should be noted that the effects described above are not necessarily limitative. Any of the effects indicated in this description or other effects that may be understood from this description may be exerted in addition to the effects described above or in place of the effects described above.

BRIEF DESCRIPTION OF DRAWING

FIG. 1 is a diagram illustrating an example of setting of a component carrier in the present embodiment.

FIG. 2 is a diagram illustrating an example of the setting of the component carrier in the present embodiment.

FIG. 3 is a diagram illustrating an example of a parameter set regarding a transmission signal in an NR cell.

FIG. 4 is a diagram illustrating an example of a downlink subframe of NR in the present embodiment.

FIG. 5 is a diagram illustrating an example of an uplink subframe of NR in the present embodiment.

FIG. 6 is a schematic block diagram illustrating a configuration of a base station apparatus 1 according to the present embodiment.

FIG. 7 is a schematic block diagram illustrating a configuration of a terminal apparatus according to the present embodiment.

FIG. 8 is an explanatory diagram for describing a summary of an example of NOMA transmission.

FIG. 9 is an explanatory diagram for describing a summary of an example of NOMA transmission.

FIG. 10 is an explanatory diagram for describing a summary of an example of NOMA transmission.

FIG. 11 is an explanatory diagram for describing the summary of the example of NOMA transmission.

FIG. 12 is an explanatory diagram for describing a summary of an example of NOMA transmission.

FIG. 13 is an explanatory diagram for describing a summary of Grant-based transmission.

FIG. 14 is an explanatory diagram for describing the summary of Grant-based transmission.

FIG. 15 is an explanatory diagram for describing a summary of a Code Block Group (CBG).

FIG. 16 is an explanatory diagram for describing the summary of the Code Block Group (CBG).

FIG. 17 is an explanatory diagram for describing the summary of the Code Block Group (CBG).

FIG. 18 is an explanatory diagram for describing the summary of the Code Block Group (CBG).

FIG. 19A is a flowchart illustrating operation examples of the base station apparatus 1 and the terminal apparatus 2 according to the present embodiment.

FIG. 19B is a flowchart illustrating operation examples of the base station apparatus 1 and the terminal apparatus 2 according to the present embodiment.

FIG. 20 is an explanatory diagram illustrating an example of a region of a flag for discrimination between OMA and NOMA.

FIG. 21 is an explanatory diagram illustrating an example of resources of a CORESET, a Search Space, and DCI.

FIG. 22 is an explanatory diagram illustrating an example of resources of the CORESET, the Search Space, and the DCI.

FIG. 23 is an explanatory diagram illustrating an example of resources of the CORESET, the Search Space, and the DCI.

FIG. 24 is an explanatory diagram illustrating an example of switching a HARQ Process Number between OMA transmission and NOMA transmission.

FIG. 25 is an explanatory diagram illustrating an example of switching the number of HARQ Processes between OMA transmission and NOMA transmission.

FIG. 26 is a block diagram illustrating a first example of a schematic configuration of an eNB to which the technology according to the present disclosure may be applied.

FIG. 27 is a block diagram illustrating a second example of the schematic configuration of the eNB to which the technology according to the present disclosure may be applied.

FIG. 28 is a block diagram illustrating an example of a schematic configuration of a smartphone to which the technology according to the present disclosure may be applied.

FIG. 29 is a block diagram illustrating an example of a schematic configuration of a car navigation apparatus to which the technology according to the present disclosure may be applied.

MODES FOR CARRYING OUT THE INVENTION

A preferred embodiment of the present disclosure is described below in detail with reference to the accompanying drawings. It should be noted that, in this description and the accompanying drawings, components that have substantially the same functional configuration are denoted by the same reference numerals, and thus redundant description thereof is omitted. In addition, unless otherwise specifically noted, technologies, functions, methods, configurations, and procedures to be described below and all other descriptions are applicable to LTE and NR.

It should be noted that the description is given in the following order.

1. Embodiment of the Present Disclosure
2. Application Examples
3. Conclusion

1. EMBODIMENT OF THE PRESENT DISCLOSURE

<Wireless Communication System According to Present Embodiment>

In the present embodiment, a wireless communication system includes at least a base station apparatus 1 and a terminal apparatus 2. The base station apparatus 1 is able to accommodate a plurality of terminal apparatuses. The base station apparatus 1 and another base station apparatus are able to be coupled to each other by means of an X2 interface. In addition, the base station apparatus 1 is able to be coupled to an EPC (Evolved Packet Core) by means of an S1 interface. Further, the base station apparatus 1 is able to be coupled to an MME (Mobility Management Entity) by means of an S1-MME interface, and is able to be coupled to an S-GW (Serving Gateway) by means of an S 1-U interface. The S1 interface supports many-to-many coupling between the MME and/or the S-GW and the base station apparatus 1. In addition, in the present embodiment, the base station apparatus 1 and the terminal apparatus 2 each support LTE and/or NR.

<Wireless Access Technology in the Present Embodiment>

In the present embodiment, the base station apparatus 1 and the terminal apparatus 2 each support one or more Radio Access Technologies (RATs). For example, RATs include LTE and NR. One RAT corresponds to one cell (component carrier). That is, in a case where a plurality of RATs is supported, these RATs correspond to respective cells different from each other. In the present embodiment, a cell is a combination of downlink resources, uplink resources, and/or sidelinks. In addition, in the following description, a cell supporting LTE is referred to as an LTE cell, and a cell supporting NR is referred to as an NR cell.

Downlink communication is communication from the base station apparatus 1 to the terminal apparatus 2. Uplink communication is communication from the terminal apparatus 2 to the base station apparatus 1. Sidelink communication is communication from the terminal apparatus 2 to another terminal apparatus 2.

The sidelink communication is defined for proximity direct detection and proximity direct communication between terminal apparatuses. It is possible to use, for the sidelink communication, a frame configuration similar to those of the uplink and the downlink. In addition, the sidelink communication may be limited to a portion (subset) of the uplink resources and/or downlink resources.

The base station apparatus 1 and the terminal apparatus 2 are able to support communication using a set of one or more cells on the downlink, uplink, and/or sidelink. A set of a plurality of cells is also referred to as carrier aggregation or dual connectivity. The details of the carrier aggregation and the dual connectivity are described below. In addition, each cell uses a predetermined frequency bandwidth. It is possible to predefine a maximum value, a minimum value, and a settable value for the predetermined frequency bandwidth.

FIG. 1 is a diagram illustrating an example of setting of a component carrier in the present embodiment. In the example of FIG. 1, one LTE cell and two NR cells are set. The one LTE cell is set as a primary cell. The two respective NR cells are set as a primary secondary cell and a secondary cell. The two NR cells are integrated by carrier aggregation. In addition, the LTE cell and the NR cells are integrated by dual connectivity. It should be noted that the LTE cell and the NR cells may be integrated by carrier aggregation. In the example of FIG. 1, the LTE cell that is a primary cell is able to assist the coupling of NR, and there is thus no necessity to support a portion of functions such as a function for stand-alone communication. The function for stand-alone communication includes a function necessary for initial coupling.

FIG. 2 is a diagram illustrating an example of the setting of a component carrier in the present embodiment. In the example of FIG. 2, two NR cells are set. The respective two NR cells are set as a primary cell and a secondary cell, and are integrated by carrier aggregation. In this case, the NR cells support a function for stand-alone communication, thereby eliminating the necessity of the assistance of an LTE cell. It should be noted that the two NR cells may be integrated by dual connectivity.

<Frame Configuration of NR in the Present Embodiment>

In each NR cell, one or more predetermined parameters are used in a certain predetermined time length (e.g., a subframe). That is, in the NR cell, a downlink signal and an uplink signal are each generated by using one or more predetermined parameters in the predetermined time length. In other words, the terminal apparatus 2 assumes that a downlink signal to be transmitted from the base station apparatus 1 and an uplink signal to be transmitted to the base station apparatus 1 are each generated by using one or more predetermined parameters in a predetermined time length. In addition, the base station apparatus 1 is able to set a downlink signal to be transmitted to the terminal apparatus 2 and an uplink signal to be transmitted from the terminal apparatus 2 to cause each of them to be generated by using one or more predetermined parameters in a predetermined time length. In a case where a plurality of predetermined parameters is used, signals generated by using those predetermined parameters are multiplexed in a predetermined method. For example, the predetermined method includes FDM (Frequency Division Multiplexing), TDM (Time Division Multiplexing), CDM (Code Division Multiplexing), and/or SDM (Spatial Division Multiplexing).

It is possible to predefine a plurality of types of parameter sets as combinations of predetermined parameters that are set in the NR cell.

FIG. 3 is a diagram illustrating an example of a parameter set regarding a transmission signal in an NR cell. In the example of FIG. 3, parameters regarding transmission signals included in the parameter sets are a subframe interval, the number of subcarriers per resource block in the NR cell, the number of symbols per subframe, and a CP length type. The CP length type is a type of CP length used in the NR cell. For example, a CP length type 1 corresponds to a normal CP in LTE, and a CP length type 2 corresponds to an extended CP in LTE.

It is possible to define the parameter sets regarding transmission signals in the NR cell individually in the downlink and the uplink. In addition, it is possible to set the parameter sets regarding transmission signals in the NR cell independently in the downlink and the uplink.

FIG. 4 is a diagram illustrating an example of a downlink subframe of NR in the present embodiment. In the example of FIG. 4, signals generated by using a parameter set 1, a parameter set 0, and a parameter set 2 are subjected to FDM in a cell (system bandwidth). The diagram illustrated in FIG. 4 is also referred to as NR downlink resource grid. The base station apparatus 1 is able to transmit a downlink physical channel of NR and/or a downlink physical signal of NR in a downlink subframe to the terminal apparatus 2. The terminal apparatus 2 is able to receive a downlink physical channel of NR and/or a downlink physical signal of NR in a downlink subframe from the base station apparatus 1.

FIG. 5 is a diagram illustrating an example of an uplink subframe of NR in the present embodiment. In the example of FIG. 5, the signals generated by using the parameter set 1, the parameter set 0, and the parameter set 2 are subjected to FDM in a cell (system bandwidth). The diagram illustrated in FIG. 5 is also referred to as NR uplink resource grid. The base station apparatus 1 is able to transmit an uplink physical channel of NR and/or an uplink physical signal of NR in an uplink subframe to the terminal apparatus 2. The terminal apparatus 2 is able to receive an uplink physical channel of NR and/or an uplink physical signal of NR in an uplink subframe from the base station apparatus 1.

<Configuration Example of Base Station Apparatus 1 in the Present Embodiment>

FIG. 6 is a schematic block diagram illustrating a configuration of the base station apparatus 1 according to the present embodiment. As illustrated in the diagram, the base station apparatus 1 includes a higher-layer processing section 101, a control section 103, a reception section 105, a transmission section 107, and a transmission/reception antenna 109. In addition, the reception section 105 includes a decoding section 1051, a demodulation section 1053, a demultiplexing section 1055, a wireless reception section 1057, and a channel measurement section 1059. In addition, the transmission section 107 includes an encoding section 1071, a modulation section 1073, a multiplexing section 1075, a wireless transmission section 1077, and a downlink reference signal generation section 1079.

As described above, the base station apparatus 1 is able to support one or more RATs. A portion or all of the components included in the base station apparatus 1 illustrated in FIG. 6 may be individually configured in accordance with a RAT. For example, the reception section 105 and the transmission section 107 are configured individually in LTE and NR. In addition, in the NR cell, a portion or all of the components included in the base station apparatus 1 illustrated in FIG. 6 may be individually configured in accordance with a parameter set regarding a transmission signal. For example, in a certain NR cell, the wireless reception section 1057 and the wireless transmission section 1077 may be individually configured in accordance with a parameter set regarding a transmission signal.

The higher-layer processing section 101 performs processing of a medium access control (MAC: Medium Access Control) layer, a packet data integration protocol (Packet Data Convergence Protocol: PDCP) layer, a radio link control (Radio Link Control: RLC) layer, and a radio resource control (Radio Resource Control: RRC) layer. In addition, the higher-layer processing section 101 generates control information for controlling the reception section 105 and the transmission section 107, and outputs the control information to the control section 103.

The control section 103 controls the reception section 105 and the transmission section 107 on the basis of the control information from the higher-layer processing section 101. The control section 103 generates control information for the higher-layer processing section 101, and outputs the control information to the higher-layer processing section 101. The control section 103 inputs a decoded signal from the decoding section 1051 and a channel estimation result from the channel measurement section 1059. The control section 103 outputs a signal to be encoded to the encoding section 1071. In addition, the control section 103 is used to control the entirety or a portion of the base station apparatus 1.

The higher-layer processing section 101 performs processing and management regarding RAT control, radio resource control, subframe setting, scheduling control, and/or CSI report control. The processing and management in the higher-layer processing section 101 are performed for each terminal apparatus or equally on terminal apparatuses coupled to the base station apparatus. The processing and management in the higher-layer processing section 101 may be performed by the higher-layer processing section 101 alone, or may be acquired from a higher node or another base station apparatus. In addition, the processing and management in the higher-layer processing section 101 may be performed individually in accordance with the RAT. For example, the higher-layer processing section 101 individually performs processing and management in LTE and processing and management in NR.

In the RAT control in the higher-layer processing section 101, management regarding the RAT is performed. For example, in the RAT control, management regarding LTE and/or management regarding NR is performed. The management regarding NR includes setting and processing of a parameter set regarding a transmission signal in an NR cell.

In the radio resource control in the higher-layer processing section 101, downlink data (transport block), system information, an RRC message (RRC parameter), and/or a MAC control element (CE: Control Element) is generated and/or managed.

In the subframe setting in the higher-layer processing section 101, subframe setting, subframe pattern setting, uplink-downlink setting, uplink reference UL-DL setting, and/or downlink reference UL-DL setting is managed. It should be noted that the subframe setting in the higher-layer processing section 101 is also referred to as base station subframe setting. In addition, it is possible to determine the subframe setting in the higher-layer processing section 101 on the basis of the amount of uplink traffic and the amount of downlink traffic. In addition, it is possible to determine the subframe setting in the higher-layer processing section 101 on the basis of a scheduling result of the scheduling control in the higher-layer processing section 101.

In the scheduling control in the higher-layer processing section 101, a frequency and a subframe to which a physical channel is allocated, the encoding rate and modulation scheme of a physical channel, transmission power, and the like are determined on the basis of received channel state information and the estimation value of a propagation path, the quality of a channel, and the like inputted from the channel measurement section 1059. For example, the control section 103 generates control information (DCI format) on the basis of a scheduling result of the scheduling control in the higher-layer processing section 101.

In the CSI report control in the higher-layer processing section 101, a CSI report of the terminal apparatus 2 is controlled. For example, setting regarding a CSI reference resource for estimation for calculating CSI in the terminal apparatus 2 is controlled.

The reception section 105 receives a signal transmitted from the terminal apparatus 2 via the transmission/reception antenna 109 under the control of the control section 103, further performs reception processing such as demultiplexing, demodulating, and decoding, and outputs information subjected to the reception processing to the control section 103. It should be noted that the reception processing in the reception section 105 is performed on the basis of predefined setting or setting of which the base station apparatus 1 notifies the terminal apparatus 2.

The wireless reception section 1057 performs conversion to an intermediate frequency (down-conversion), removes an unnecessary frequency component, controls an amplifying level to appropriately maintain a signal level, performs quadrature demodulation based on an in-phase component and a quadrature component of the received signal, converts an analogue signal to a digital signal, removes a guard interval (Guard Interval: GI), and/or extracts a frequency-domain signal by using fast Fourier transform (Fast Fourier Transform: FFT) for an uplink signal received via the transmission/reception antenna 109.

The demultiplexing section 1055 separates an uplink channel such as a PUCCH or a PUSCH and/or an uplink reference signal from a signal inputted from the wireless reception section 1057. The demultiplexing section 1055 outputs an uplink reference signal to the channel measurement section 1059. The demultiplexing section 1055 compensates a propagation path for the uplink channel from the estimation value of the propagation path inputted from the channel measurement section 1059.

The demodulation section 1053 demodulates a reception signal by using modulation schemes such as BPSK (Binary Phase Shift Keying), QPSK (Quadrature Phase shift Keying), 16 QAM (Quadrature Amplitude Modulation), 64 QAM, and 256 QAM for a modulation symbol of an uplink channel. The demodulation section 1053 separates and demodulates a MIMO-multiplexed uplink channel.

The decoding section 1051 performs decoding processing on encoding bits of the demodulated uplink channel. The decoded uplink data and/or uplink control information is outputted to the control section 103. The decoding section 1051 performs decoding processing on a PUSCH for each transport block.

The channel measurement section 1059 measures, for example, the estimation value of a propagation channel and/or the quality of a channel from the uplink reference signal inputted from the demultiplexing section 1055, and outputs the estimation value and/or the quality to the demultiplexing section 1055 and/or the control section 103. For example, a UL-DMRS measures the estimation value of a propagation path for compensating a propagation path for a PUCCH or a PUSCH, and an SRS measures the quality of a channel in the uplink.

The transmission section 107 performs transmission processing such as encoding, modulation, and multiplexing on downlink control information and downlink data inputted from the higher-layer processing section 101 under the control of the control section 103. For example, the transmission section 107 generates and multiplexes a PHICH, a PDCCH, an EPDCCH, a PDSCH, and a downlink reference signal, and generates transmission signals. It should be noted that the transmission processing in the transmission section 107 is performed on the basis of predefined setting, setting of which the base station apparatus 1 notifies the terminal apparatus 2, or setting of which notification is issued through a PDCCH or an EPDCCH transmitted in the same subframe.

The encoding section 1071 encodes a HARQ indicator (HARQ-ACK), downlink control information, and downlink data inputted from the control section 103 by using a predetermined coding scheme such as block coding, convolutional coding, and turbo coding. The modulation section 1073 modulates encoding bits inputted from the encoding section 1071 in a predetermined modulation scheme such as BPSK, QPSK, 16 QAM, 64 QAM, or 256 QAM. The downlink reference signal generation section 1079 generates a downlink reference signal on the basis of a physical cell identifier (PCI: Physical cell identification), an RRC parameter set in the terminal apparatus 2, and the like. The multiplexing section 1075 multiplexes modulation symbols of respective channels and downlink reference signals, and disposes the modulation symbols and downlink reference signals in predetermined resource elements.

The wireless transmission section 1077 performs processing on a signal from the multiplexing section 1075 such as conversion into a signal in a time domain by inverse fast Fourier transform (Inverse Fast Fourier Transform: IFFT), addition of a guard interval, generation of a baseband digital signal, conversion into an analog signal, quadrature modulation, conversion from an intermediate frequency signal into a high frequency signal (up-conversion: up convert), removal of an extra frequency component, and amplification of power, and generates a transmission signal. The transmission signal outputted by the wireless transmission section 1077 is transmitted from the transmission/reception antenna 109.

<Configuration Example of Terminal Apparatus 2 in the Present Embodiment>

FIG. 7 is a schematic block diagram illustrating a configuration of the terminal apparatus 2 according to the present embodiment. As illustrated in the diagram, the terminal apparatus 2 includes a higher-layer processing section 201, a control section 203, a reception section 205, a transmission section 207, and a transmission/reception antenna 209. In addition, the reception section 205 includes a decoding section 2051, a demodulation section 2053, a demultiplexing section 2055, a wireless reception section 2057, and a channel measurement section 2059. In addition, the transmission section 207 includes an encoding section 2071, a modulation section 2073, a multiplexing section 2075, a wireless transmission section 2077, and an uplink reference signal generation section 2079.

As described above, the terminal apparatus 2 is able to support one or more RATs. A portion or all of the components included in the terminal apparatus 2 illustrated in FIG. 7 may be individually configured in accordance with a RAT. For example, the reception section 205 and the transmission section 207 are configured individually in LTE and NR. In addition, in the NR cell, a portion or all of the components included in the terminal apparatus 2 illustrated in FIG. 7 may be individually configured in accordance with a parameter set regarding a transmission signal. For example, in a certain NR cell, the wireless reception section 2057 and the wireless transmission section 2077 may be individually configured in accordance with a parameter set regarding a transmission signal.

The higher-layer processing section 201 outputs uplink data (transport block) to the control section 203. The higher-layer processing section 201 performs processing of a medium access control (MAC: Medium Access Control) layer, a packet data integration protocol (Packet Data Convergence Protocol: PDCP) layer, a radio link control (Radio Link Control: RLC) layer, and a radio resource control (Radio Resource Control: RRC) layer. In addition, the higher-layer processing section 201 generates control information for controlling the reception section 205 and the transmission section 207, and outputs the control information to the control section 203.

The control section 203 controls the reception section 205 and the transmission section 207 on the basis of the control information from the higher-layer processing section 201. The control section 203 generates control information for the higher-layer processing section 201, and outputs the control information to the higher-layer processing section 201. The control section 203 inputs a decoded signal from the decoding section 2051 and a channel estimation result from the channel measurement section 2059. The control section 203 outputs a signal to be encoded to the encoding section 2071. In addition, the control section 203 may be used to control the entirety or a portion of the terminal apparatus 2.

The higher-layer processing section 201 performs processing and management regarding RAT control, radio resource control, subframe setting, scheduling control, and/or CSI report control. The processing and management in the higher-layer processing section 201 are performed on the basis of predefined setting and/or setting based on control information that is set from the base station apparatus 1 or control information of which notification is issued from the base station apparatus 1. For example, the control information from the base station apparatus 1 includes an RRC parameter, a MAC control element, or DCI. In addition, the processing and management in the higher-layer processing section 201 may be performed individually in accordance with the RAT. For example, the higher-layer processing section 201 individually performs processing and management in LTE and processing and management in NR.

In the RAT control in the higher-layer processing section 201, management regarding the RAT is performed. For example, in the RAT control, management regarding LTE and/or management regarding NR is performed. The management regarding NR includes setting and processing of a parameter set regarding a transmission signal in an NR cell.

In the radio resource control in the higher-layer processing section 201, the management of setting information in the own apparatus is performed. In the radio resource control in the higher-layer processing section 201, uplink data (transport block), system information, an RRC message (RRC parameter), and/or a MAC control element (CE: Control Element) is generated and/or managed.

In the subframe setting in the higher-layer processing section 201, the subframe setting in the base station apparatus 1 and/or a base station apparatus different from the base station apparatus 1 is managed. The subframe setting includes setting of an uplink or downlink for a subframe, subframe pattern setting, uplink-downlink setting, uplink reference UL-DL setting, and/or downlink reference UL-DL setting. It should be noted that the subframe setting in the higher-layer processing section 201 is also referred to as terminal subframe setting.

In the scheduling control in the higher-layer processing section 201, control information for performing control regarding scheduling for the reception section 205 and the transmission section 207 is generated on the basis of DCI (scheduling information) from the base station apparatus 1.

In the CSI report control in the higher-layer processing section 201, control regarding a CSI report to the base station apparatus 1 is performed. For example, in the CSI report control, setting regarding a CSI reference resource for estimation for calculating CSI in the channel measurement section 2059 is controlled. In the CSI report control, a resource (timing) used to report CSI is controlled on the basis of DCI and/or an RRC parameter.

The reception section 205 receives a signal transmitted from the base station apparatus 1 via the transmission/reception antenna 209 under the control of the control section 203, further performs reception processing such as demultiplexing, demodulating, and decoding, and outputs information subjected to the reception processing to the control section 203. It should be noted that the reception processing in the reception section 205 is performed on the basis of predefined setting or notification or setting from the base station apparatus 1.

The wireless reception section 2057 performs conversion to an intermediate frequency (down-conversion), removes an unnecessary frequency component, controls an amplifying level to appropriately maintain a signal level, performs quadrature demodulation based on an in-phase component and a quadrature component of the received signal, converts an analog signal to a digital signal, removes a guard interval (Guard Interval: GI), and/or extracts a signal in a frequency domain by fast Fourier transform (Fast Fourier Transform: FFT) for an uplink signal received via the transmission/reception antenna 209.

The demultiplexing section 2055 separates a downlink channel such as a PHICH, a PDCCH, an EPDCCH, or a PDSCH, a downlink synchronization signal, and/or a downlink reference signal from a signal inputted from the wireless reception section 2057. The demultiplexing section 2055 outputs a downlink reference signal to the channel measurement section 2059. The demultiplexing section 2055 compensates a propagation path for the downlink channel from the estimation value of the propagation path inputted from the channel measurement section 2059.

The demodulation section 2053 demodulates a reception signal by using a modulation scheme such as BPSK, QPSK, 16 QAM, 64 QAM, or 256 QAM for a modulation symbol of a downlink channel. The demodulation section 2053 separates and demodulates a MIMO-multiplexed downlink channel.

The decoding section 2051 performs decoding processing on encoding bits of the demodulated downlink channel. The decoded downlink data and/or downlink control information is outputted to the control section 203. The decoding section 2051 performs decoding processing on a PDSCH for each transport block.

The channel measurement section 2059 measures, for example, the estimation value of a propagation channel and/or the quality of a channel from the downlink reference signal inputted from the demultiplexing section 2055, and outputs the estimation value and/or the quality to the demultiplexing section 2055 and/or the control section 203. The downlink reference signal used by the channel measurement section 2059 for measurement may be determined at least on the basis of a transmission mode set by an RRC parameter, and/or another RRC parameter. For example, a DL-DMRS measures the estimation value of a propagation path for compensating a propagation path for a PDSCH or an EPDCCH. A CRS measures the estimation value of a propagation path for compensating a propagation path for a PDCCH or a PDSCH and/or a downlink channel for reporting CSI. A CSI-RS measures a downlink channel for reporting CSI. The channel measurement section 2059 calculates RSRP (Reference Signal Received Power) and/or RSRQ (Reference Signal Received Quality) on the basis of the CRS, the CSI-RS, or a detection signal, and outputs the calculated RSRP and/or RSRQ to the higher-layer processing section 201.

The transmission section 207 performs transmission processing such as encoding, modulation, and multiplexing on the uplink control information and uplink data inputted from the higher-layer processing section 201 under the control of the control section 203. For example, the transmission section 207 generates and multiplexes an uplink channel such as a PUSCH or a PUCCH and/or an uplink reference signal, and generates a transmission signal. It should be noted that the transmission processing in the transmission section 207 is performed on the basis of the predefined setting or the setting or notification from the base station apparatus 1.

The encoding section 2071 encodes a HARQ indicator (HARQ-ACK), uplink control information, and uplink data inputted from the control section 203 by using a predetermined coding scheme such as block coding, convolutional coding, and turbo coding. The modulation section 2073 modulates encoding bits inputted from the encoding section 2071 in a predetermined modulation scheme such as BPSK, QPSK, 16 QAM, 64 QAM, or 256 QAM. The uplink reference signal generation section 2079 generates an uplink reference signal on the basis of an RRC parameter set in the terminal apparatus 2, and the like. The multiplexing section 2075 multiplexes modulation symbols of respective channels and uplink reference signals, and disposes the modulation symbols and uplink reference signals in predetermined resource elements.

The wireless transmission section 2077 performs processing on a signal from the multiplexing section 2075 such as conversion into a signal in a time domain by inverse fast Fourier transform (Inverse Fast Fourier Transform: IFFT), addition of a guard interval, generation of a baseband digital signal, conversion into an analog signal, quadrature modulation, conversion from an intermediate frequency signal into a high frequency signal (up-conversion: up convert), removal of an extra frequency component, and amplification of power, and generates a transmission signal. The transmission signal outputted by the wireless transmission section 2077 is transmitted from the transmission/reception antenna 209.

<Signaling of Control Information in the Present Embodiment>

The base station apparatus 1 and the terminal apparatus 2 are each able to use various methods for signaling (notification, broadcasting, and setting) of control information. It is possible to signal control information in various layers (layers). Signaling of control information includes physical-layer signaling that is signaling performed through a physical layer (layer), RRC signaling that is signaling performed through an RRC layer, MAC signaling that is signaling performed through a MAC layer, and the like. The RRC signaling is dedicated RRC signaling (Dedicated RRC signaling) in which a notification of control information specific to the terminal apparatus 2 is issued, or common RRC signaling (Common RRC signaling) in which a notification of control information specific to the base station apparatus 1 is issued. Signaling used by a higher layer than the physical layer such as the RRC signaling and the MAC signaling is also referred to as higher-layer signaling.

The RRC signaling is achieved by signaling an RRC parameter. The MAC signaling is achieved by signaling a MAC control element. Physical layer signaling is achieved by signaling downlink control information (DCI: Downlink Control Information) or uplink control information (UCI: Uplink Control Information). The RRC parameter and the MAC control element are transmitted by using a PDSCH or a PUSCH. The DCI is transmitted by using a PDCCH or an EPDCCH. UCI is transmitted by using a PUCCH or a PUSCH. The RRC signaling and the MAC signaling are used to signal semi-static (semi-static) control information, and are also referred to as semi-static signaling. The physical layer signaling is used to signal dynamic (dynamic) control information, and is also referred to as dynamic signaling. The DCI is used to schedule a PDSCH, a PUSCH, or the like. The UCI is used, for example, for a CSI report, an HARQ-ACK report, and/or a scheduling request (SR: Scheduling Request).

<Signaling of Control Information in the Present Embodiment>

The base station apparatus 1 and the terminal apparatus 2 are each able to use various methods for signaling (notification, broadcasting, and setting) of control information. It is possible to signal control information in various layers (layers). Signaling of control information includes physical-layer signaling that is signaling performed through a physical layer (layer), RRC signaling that is signaling performed through an RRC layer, MAC signaling that is signaling performed through a MAC layer, and the like. The RRC signaling is dedicated RRC signaling (Dedicated RRC signaling) in which a notification of control information specific to the terminal apparatus 2 is issued, or common RRC signaling (Common RRC signaling) in which a notification of control information specific to the base station apparatus 1 is issued. Signaling used by a higher layer than the physical layer such as the RRC signaling and the MAC signaling is also referred to as higher-layer signaling.

The RRC signaling is achieved by signaling an RRC parameter. The MAC signaling is achieved by signaling a MAC control element. Physical layer signaling is achieved by signaling downlink control information (DCI: Downlink Control Information) or uplink control information (UCI: Uplink Control Information). The RRC parameter and the MAC control element are transmitted by using a PDSCH or a PUSCH. The DCI is transmitted by using a PDCCH or an EPDCCH. UCI is transmitted by using a PUCCH or a PUSCH. The RRC signaling and the MAC signaling are used to signal semi-static (semi-static) control information, and are also referred to as semi-static signaling. The physical layer signaling is used to signal dynamic (dynamic) control information, and is also referred to as dynamic signaling. The DCI is used to schedule a PDSCH, a PUSCH, or the like. The UCI is used, for example, for a CSI report, an HARQ-ACK report, and/or a scheduling request (SR: Scheduling Request).

<Details of Downlink Control Information in the Present Embodiment>

A notification of the DCI is issued by using a DCI format having a predefined field. A predetermined information bit of the field defined in the DCI format is mapped. The DCI issues a notification of downlink scheduling information, uplink scheduling information, sidelink scheduling information, a request for an aperiodic CSI report, or an uplink transmission power command.

The DCI format monitored by the terminal apparatus 2 is determined by a transmission mode set for each serving cell. That is, a portion of the DCI format monitored by the terminal apparatus 2 is variable depending on the transmission mode. For example, the terminal apparatus 2 in which a downlink transmission mode 1 is set monitors a DCI format 1A and a DCI format 1. For example, the terminal apparatus 2 in which a downlink transmission mode 4 is set monitors the DCI format 1A and a DCI format 2. For example, the terminal apparatus 2 in which an uplink transmission mode 1 is set monitors a DCI format 0. For example, the terminal apparatus 2 in which an uplink transmission mode 2 is set monitors the DCI format 0 and a DCI format 4.

A notification of a control region in which the PDCCH for issuing a notification of the DCI for the terminal apparatus 2 is disposed is not issued, and the terminal apparatus 2 detects the DCI for the terminal apparatus 2 by blind decoding (blind detection). Specifically, the terminal apparatus 2 monitors a set of PDCCH candidates in the serving cell. Monitoring means that decoding is attempted for each PDCCH in the set by all DCI formats to be monitored. For example, the terminal apparatus 2 attempts to decode all aggregation levels, PDCCH candidates, and DCI formats that are possibly transmitted to the terminal apparatus 2. The terminal apparatus 2 recognizes DCI (PDCCH) that is successfully decoded (detected) as DCI (PDCCH) for the terminal apparatus 2.

A cyclic redundancy check (CRC: Cyclic Redundancy Check) is added to the DCI. The CRC is used for DCI error detection and DCI blind detection. The CRC (CRC parity bit) is scrambled by an RNTI (Radio Network Temporary Identifier). On the basis of the RNTI, the terminal apparatus 2 detects whether or not the DCI is DCI for the terminal apparatus 2. Specifically, the terminal apparatus 2 descrambles a bit corresponding to the CRC by a predetermined RNTI, extracts the CRC, and detects whether or not the corresponding DCI is correct.

The RNTI is defined or set in accordance with the purpose and application of DCI. The RNTI includes a C-RNTI (Cell-RNTI), an SPS C-RNTI (Semi Persistent Scheduling C-RNTI), an SI-RNTI (System Information-RNTI), a P-RNTI (Paging-RNTI), an RA-RNTI (Random Access-RNTI), a TPC-PUCCH-RNTI (Transmit Power Control-PUCCH-RNTI), a TPC-PUSCH-RNTI (Transmit Power Control-PUSCH-RNTI), a temporary C-RNTI, an M-RNTI (MBMS (Multimedia Broadcast Multicast Services)-RNTI), and an eIMTA-RNTI.

The C-RNTI and the SPS C-RNTI are RNTIs specific to the terminal apparatus 2 in the base station apparatus 1 (cell), and are identifiers for identifying the terminal apparatus 2. The C-RNTI is used to schedule a PDSCH or a PUSCH in a certain subframe. The SPS C-RNTI is used to activate or release periodic scheduling of a resource for a PDSCH or a PUSCH. A control channel having a CRC scrambled by the SI-RNTI is used to schedule a SIB (System Information Block). A control channel having a CRC scrambled by the P-RNTI is used to control paging. A control channel having a CRC scrambled by the RA-RNTI is used to schedule a response to a RACH. A control channel having a CRC scrambled by the TPC-PUCCH-RNTI is used to control power of a PUCCH. A control channel having a CRC scrambled by the TPC-PUSCH-RNTI is used to control power of a PUSCH. A control channel having a CRC scrambled by the Temporary C-RNTI is used by a mobile station apparatus in which the C-RNTI is not set or recognized. A control channel having a CRC scrambled by the M-RNTI is used to schedule MBMS. A control channel having a CRC scrambled by the eIMTA-RNTI is used to issue a notification of information regarding TDD UL/DL setting of a TDD serving cell in dynamic TDD (eIMTA). It should be noted that the DCI format may be scrambled by not only the RNTIs described above, but also a new RNTI.

The scheduling information (downlink scheduling information, uplink scheduling information, and sidelink scheduling information) includes information for performing scheduling in units of resource blocks or resource block groups as scheduling in a frequency domain. A resource block group is a set of consecutive resource blocks, and indicates allocated resources for a terminal apparatus to be scheduled. The size of the resource block group depends on a system bandwidth.

<Details of Downlink Control Channel in the Present Embodiment>

The DCI is transmitted by using a control channel such as a PDCCH or an EPDCCH. The terminal apparatus 2 monitors a set of PDCCH candidates and/or a set of EPDCCH candidates of one or more activated serving cells set by the RRC signaling. Here, the monitoring is an attempt to decode PDCCHs and/or EPDCCHs in sets corresponding to all the DCI formats to be monitored.

The set of PDCCH candidates or the set of EPDCCH candidates is also referred to as a search space. As the search space, a common search space (CSS) and a terminal-specific search space (USS) are defined. The CSS may be defined only for a search space regarding PDCCHs.

The CSS (Common Search Space) is a search space that is set on the basis of a parameter specific to the base station apparatus 1 and/or a predefined parameter. For example, the CSS is a search space shared between a plurality of terminal apparatuses. Therefore, the base station apparatus 1 maps a control channel common to a plurality of terminal apparatuses to the CSS, thereby reducing resources for transmitting the control channel.

The USS (UE-specific Search Space) is a search space that is set by using a parameter that is at least specific to the terminal apparatus 2. Therefore, the USS is a search space specific to the terminal apparatus 2, and allows a control channel specific to the terminal apparatus 2 to be individually transmitted. This allows the base station apparatus 1 to efficiently map control channels specific to a plurality of terminal apparatuses.

The USS may be set to be common to a plurality of terminal apparatuses. To set the USS common to a plurality of terminal apparatuses, a parameter specific to the terminal apparatus 2 is set to have the same value in the plurality of terminal apparatuses. Examples of a unit set for the same parameter in the plurality of terminal apparatuses include a cell, a transmission point, a group of predetermined terminal apparatuses, or the like.

A search space for each aggregation level is defined by a set of PDCCH candidates. Each PDCCH is transmitted by using a set of one or more CCEs (Control Channel Elements). The number of CCEs used for one PDCCH is also referred to as aggregation level. For example, the number of CCEs used for one PDCCH is 1, 2, 4, or 8.

A search space for each aggregation level is defined by a set of EPDCCH candidates. Each EPDCCH is transmitted by using a set of one or more ECCEs (Enhanced Control Channel Elements). The number of ECCEs used for one EPDCCH is also referred to as aggregation level. For example, the number of ECCEs used for one EPDCCH is 1, 2, 4, 8, 16, or 32.

The number of PDCCH candidates or the number of EPDCCH candidates is determined at least on the basis of the search space and the aggregation level. For example, in the CSS, the number of PDCCH candidates at an aggregation level of 4 is 4 and the number of PDCCH candidates at an aggregation level of 8 is 2. For example, in the USS, the number of PDCCH candidates at aggregation of 1 is 6, the number of PDCCH candidates at aggregation of 2 is 6, the number of PDCCH candidates at aggregation of 4 is 2, and the number of PDCCH candidates at aggregation of 8 is 2.

Each ECCE includes a plurality of EREGs (Enhanced Resource Element Groups). The EREG is used to define mapping to a resource element of the EPDCCH. Sixteen EREGs that are numbered from 0 to 15 are defined in each RB pair. That is, EREG 0 to EREG 15 are defined in each RB pair. In each RB pair, the EREG 0 to the EREG 15 are preferentially defined at regular intervals in the frequency direction for resource elements other than resource elements to which a predetermined signal and/or channel is mapped. For example, the EREG is not defined for a resource element to which a demodulating reference signal associated with an EPDCCH transmitted from antenna ports 107 to 110 is mapped.

The number of ECCEs used for one EPDCCH depends on an EPDCCH format, and is determined on the basis of another parameter. The number of ECCEs used for one EPDCCH is also referred to as aggregation level. For example, the number of ECCEs used for one EPDCCH is determined on the basis of the number of resource elements that are available for transmission of the EPDCCH in one RB pair, a method of transmitting the EPDCCH, and the like. For example, the number of ECCEs used for one EPDCCH is 1, 2, 4, 8, 16, or 32. In addition, the number of EREGs used for one ECCE is determined on the basis of the type of subframe and the type of cyclic prefix, and is 4 or 8. Distributed transmission (Distributed transmission) and localized transmission (Localized transmission) are supported as the method of transmitting the EPDCCH.

It is possible use the distributed transmission or the localized transmission for the EPDCCH. The distributed transmission and the localized transmission differ in mapping of the ECCE to the EREG and the RB pair. For example, in the distributed transmission, one ECCE is configured using EREGs of a plurality of RB pairs. In the local transmission, one ECCE is configured using an EREG of one RB pair.

The base station apparatus 1 performs setting regarding the EPDCCH for the terminal apparatus 2. The terminal apparatus 2 monitors a plurality of EPDCCHs on the basis of the setting from the base station apparatus 1. A set of RB pairs for the terminal apparatus 2 to monitor EPDCCHs may be set. The set of RB pairs is also referred to as EPDCCH set or EPDCCH-PRB set. It is possible to set one or more EPDCCH sets for the one terminal apparatus 2. Each EPDCCH set includes one or more RB pairs. In addition, it is possible to perform the setting regarding the EPDCCH individually for each EPDCCH set.

The base station apparatus 1 is able to set a predetermined number of EPDCCH sets for the terminal apparatus 2. For example, it is possible to set up to two EPDCCH sets as an EPDCCH set 0 and/or an EPDCCH set 1. Each of the EPDCCH sets is able to include a predetermined number of RB pairs. Each EPDCCH set constitutes one set of a plurality of ECCEs. The number of ECCEs constituted in one EPDCCH set is determined on the basis of the number of RB pairs set as the EPDCCH set and the number of EREGs used for one ECCE. In a case where the number of ECCEs constituted in one EPDCCH set is N, each EPDCCH set constitutes ECCEs numbered from 0 to N−1. For example, in a case where the number of EREGs used for one ECCE is 4, an EPDCCH set including four RB pairs constitutes 16 ECCEs.

<Non-Orthogonal Multiple Access (NOMA)>

In orthogonal multiple access (Orthogonal Multiple Access: OMA) transmission, for example, transmission and reception are performed using a frequency axis and a time axis that are orthogonal to each other. At this time, a frame configuration of frequency and time resources is determined by a subcarrier interval, and it is difficult to use the number of resources equal to or greater than the number of resource elements. In contrast, in NOMA transmission, non-orthogonal axes are added in addition to the frequency axis and the time axis that are orthogonal to each other to determine a frame configuration. It should be noted that examples of the non-orthogonal axes include an Interleave pattern axis, a Spreading Pattern axis, a Scrambling Pattern axis, a Codebook axis, a Power axis, and the like.

For example, FIG. 8 is an explanatory diagram for describing a summary of an example of NOMA transmission, and illustrates a case of a parameter set in which transmission signals are multiplexed on non-orthogonal axes in a transmitter and all resources multiplexed on the non-orthogonal axis are the same. Here, the transmitter indicates one of the base station apparatus 1 and the terminal apparatus 2. In the transmitter, a plurality of transmission signal sets to be multiplexed are prepared. In FIG. 8, two transmission signal sets are assumed to be multiplexed. Two transmission signal sets are used here, but three or more transmission signal sets may be used. In addition, the respective transmission signal sets may be transmission signals to different receivers, or may be transmission signals to the same receiver. Here, the receiver indicates one of the base station apparatus 1 and the terminal apparatus 2. A corresponding Multiple Access (MA) signatures is applied to each of the transmission signal sets. Here, examples of the MA signature include an Interleave pattern, a Spreading Pattern, a Scrambling Pattern, a Codebook, Power Allocation, Repetition, and the like. In addition, the term "MA signature" is used here, but a term "Pattern" or "Index" may be also used, and indicates an identifier such as a Pattern and an Index used in NOMA transmission described above as an example, or the Pattern itself. Signals after the MA signatures are applied are multiplexed on the same frequency and time resources, and are sent to the same antenna port.

In addition, in FIG. 8, a transmission signal set of the same parameter set is multiplexed; however, a transmission signal set of different parameter sets may be multiplexed as illustrated in FIG. 9. FIG. 9 is an explanatory diagram for describing a summary of another example of NOMA transmission, and is similar to FIG. 8 except that the transmission signal set of the different parameter sets is multiplexed.

In contrast, as illustrated in FIGS. 10 and 11, there is also considered a method of transmitting signals to which the MA signatures are applied without multiplexing in the transmitter to cause the receiver to perform non-orthogonal multiplexing on the signals. FIGS. 10 and 11 are explanatory diagrams for describing a summary of another example of NOMA transmission, and illustrate an example in a case where multiplexing by the transmitter is not performed. In the example illustrated in FIGS. 10 and 11, a corresponding MA signature is applied to each of the transmission signal sets. Here, examples of the MA signatures include an Interleave pattern, a Spreading Pattern, a Scrambling Pattern, a Codebook, Power Allocation, Repetition, and the like. Signals after the MA signatures are applied are transmitted on the same frequency and time resources, and are multiplexed through a propagation channel. In this case, the respective transmission signal sets may be transmitted from different transmitters. In addition, as illustrated in FIG. 11, the parameter sets of the transmission signals transmitted on the same frequency and time resources may be different parameter sets.

FIG. 12 is an explanatory diagram for describing a summary of an example of NOMA transmission, and illustrates an example of the receiver. As illustrated in FIG. 12, reception signals are received in a state in which a plurality of transmission signals are multiplexed on the same frequency and time resources. In the receiver, the MA signatures applied in the transmitter are applied in order to decode the multiplexed transmission signal sets, and desired signals are extracted by channel equalization and an interference signal canceller. At this time, in a case where signals are multiplexed using the same MA signatures, an influence of interference between multiplexed signals may increase, which may cause difficulty in decoding the signals.

As described above, in NOMA transmission, it is necessary to share, between the transmitter and the receiver, the MA signatures applied in the transmitter and the receiver, and apply the MA signatures without overlapping. In addition, resources in the following description include an MA signature as one of the resources. Here, resources including all a frequency, a time, and the MA signatures may be also referred to as Multiple Access (MA) resources, and resources including only the frequency and the time may be also referred to as Multiple Access (MA) Physical resources.

<Grant-Free Transmission>

Grant-free transmission indicates that the terminal apparatus 2 performs transmission using appropriate resources from available frequency and time resources indicated by the base station apparatus 1 in advance without receiving dynamic resource allocation (Grant) from the base station apparatus 1. That is, Grant-free transmission indicates performing data transmission without including the Grant in Downlink Control Information (DCI). Although Grant-free transmission is also referred to as data transmission without grant, or the like, in the following description, Grant-free transmission is used for the sake of convenience. In Grant-free transmission, the base station apparatus 1 may specify candidates of frequency and time resources selectable by the terminal apparatus 2.

Main purposes of applying Grant-free transmission include reduction of power consumption and low-delay communication of the terminal apparatus 2 by reduction of signaling overhead. In existing schemes, the base station apparatus 1 has notified the terminal apparatus 2 of resources to be used in the Uplink and the Sidelink, thereby having made it possible to perform communication without occurrence of resource contention with another terminal apparatus 2. In contrast, in the existing schemes, signaling overhead by such a notification may occur.

For example, FIG. 13 is an explanatory diagram for describing a summary of Grant-based transmission. For example, in a case of Grant-based transmission as illustrated in FIG. 13, in a case where data is generated (S11), the terminal apparatus 2 transmits a resource allocation request to the base station apparatus 1 (S12). The base station apparatus 1 allocates resources to the terminal apparatus 2 in response to the resource allocation request from the terminal apparatus 2 (S13). Next, the terminal apparatus 2 transmits data with use of the resources allocated by the base station apparatus 1 (S14). Upon reception of the data transmitted from the terminal apparatus 2, the base station apparatus 1 transmits a response (for example, ACK/NACK) to the terminal apparatus 2 (S15). In Grant-based transmission, such a configuration causes signaling overhead associated with the resource allocation request from the terminal apparatus 2 and resource allocation by the base station apparatus 1.

In contrast, FIG. 14 is an explanatory diagram for describing a summary of Grant-free transmission. In a case of Grant-free transmission as illustrated in FIG. 14, the base station apparatus 1 allocates available sources to the terminal apparatus 2 in advance (S21). In a case where data is generated (S22), the terminal apparatus 2 transmits the data to the base station apparatus 1 with use of resources optionally selected from the resources allocated in advance (S23). Upon reception of the data transmitted from the terminal apparatus 2, the base station apparatus 1 transmits a response (for example, ACK/NACK) to the terminal apparatus 2 (S24). As described above, in the case of Grant-free transmission, processes regarding the resource allocation request from the terminal apparatus 2 and resource allocation by the base station apparatus 1 in Grant-based transmission illustrated in FIG. 13 are reduced. Accordingly, Grant-free transmission in which a notification of resource allocation is not issued is considered as a promising technological candidate for reduction of power consumption and low-delay communication that are desired in next-generation communication. It should be noted that transmission resources in Grant-free transmission may be selected from an entire available band, or may be selected from resources specified by the base station apparatus 1 in advance.

<Code Block Group (CBG)>

CBG indicates that one or a plurality of Code Blocks is put into some Groups. For example, as illustrated in FIG. 15, it is assumed that one Transport Block (TB) includes eight CBs. The CBG indicates that these CBs are divided into one or a plurality of Groups. An example in FIG. 15 is an example in which the CBs are divided into four CBGs each including two CBs. FIG. 16 illustrates an example in which the CBs are divided into two CBGs each including four CBs. In addition, it is not necessary to equally divide CBs into CBGs, and, for example, as illustrated in FIG. 17, there is an example in which a CBG #0 and a CBG #1 each include three CBs and a CBG #2 includes two CBs. In addition, as illustrated in FIG. 18, a CBG may include all the CBs. A notification of information such as the number of CBGs existing and the number of CBs included in one CBG may be semi-statically issued with use of RRC Signaling, System Information, or the like, or may be dynamically issued with use of DCI or the like. The respective CBs are allocated to the CBGs under a predetermined rule in accordance with the number of CBGs and the number of CBs corresponding to a TB size of which a notification has been issued.

In addition, the base station apparatus 1 performs setting, on the terminal apparatus 2, of whether or not to perform CBG transmission (CBG-based transmission). At this time, setting is possible in each link such as downlink and uplink. In a case where CBG-based transmission is not set, only a TB is transmitted (TB-based transmission).

In a case of CBG transmission, information such as which CBG is being transmitted is necessary. One of methods of issuing a notification of this information is a method of issuing a notification of the information with use of DCI. Information of the DBG included in the DCI may be referred to as CBG transmission information (CBGTI). In the CBGTI, the number of bits may vary in accordance with the preset number of CBGs. For example, in a case where the number of CBGs is set to four, an example in which the CBGTI has a four-bit Field in DCI is considered.

Further, as an application of the CBG, it is considered to issue a notification of information for determining how the CB G is synthesized at the time of retransmission. This information may be referred to as CBG flushing out information (CBGFI). The CBGFI may have a single bit or a plurality of bits in DCI. How information represented by the CBGFI is to be treated is considered dependent on implementation, but there is considered an example in which while a retransmitted CBG is synthesized with an initially transmitted CB G and decoded similarly to a normal operation, for example, in a case where a CBGFI bit is 0, the retransmitted DBG is not synthesized with the initially transmitted CBG and only the retransmitted CBG is decoded in a case where the CB GFI bit is 1.

<Switching of Setting or the like for Transmission or Reception in accordance with Whether Communication is NOMA Communication or OMA Communication>

The base station apparatus 1 or the terminal apparatus 2 according to the present embodiment performs switching of setting or the like for transmission or reception in accordance with whether communication is NOMA communication or OMA communication, thereby making it possible to perform wireless communication more efficiently. Here, examples of the setting or the like for transmission or reception in accordance with whether communication is NOMA communication or OMA communication may include a parameter to be used for transmission control or reception control, setting regarding a transmission scheme, setting of a resource, and the like. Details of the setting or the like for transmission or reception in accordance with whether communication is NOMA communication or OMA communication are described in detail later, and an example of a basic sequence is first described.

FIGS. 19A and 19B are flowcharts illustrating operation examples of the base station apparatus 1 and the terminal apparatus 2 according to the present embodiment. FIGS. 19A and 19B illustrate operation examples of the base station apparatus 1 and the terminal apparatus 2 that perform switching of the setting or the like for transmission or reception in accordance with whether communication is NOMA communication or OMA communication.

The terminal apparatus 2 notifies the base station apparatus 1 of whether or not NOMA transmission or reception is supported (step S301). The base station apparatus 1 performs setting, on the terminal apparatus 2, of whether or not there is a possibility of performing NOMA transmission or NOMA reception or whether or not to surely perform NOMA transmission or NOMA reception (step S302). Here, in a case where the base station apparatus 1 performs setting that there is a possibility of performing NOMA transmission or NOMA reception, the terminal apparatus 2 determines, on the basis of a predetermined judgement criterion, whether or not to perform NOMA transmission or NOMA reception. As an example of the predetermined judgement criterion, for example, a criterion based on DCI information transmitted from the base station apparatus 1 to the terminal apparatus 2 may be adopted, and the predetermined criterion may be determined under a predetermined rule.

Thereafter, for example, it is assumed that uplink transmission data is generated in the terminal apparatus 2 (step S303). If necessary, the terminal apparatus 2 sends a request for allocation of uplink resources to the base station apparatus 1 (step S304). The base station apparatus 1 allocates uplink resources to the terminal apparatus 2, if necessary (step S305). At this time, the base station apparatus 1 notifies the terminal apparatus 2 of whether or not to perform NOMA transmission, if necessary. The terminal apparatus 2 determines whether or not to perform NOMA transmission, if such determination is necessary (step S306). Here, in a case where NOMA transmission is to be performed, the terminal apparatus 2 performs switching of necessary setting or the like for signal transmission to setting for NOMA transmission (step S307), and performs uplink transmission (step 308).

The base station apparatus 1 having received an uplink transmission signal determines whether or not to perform NOMA reception if such determination is necessary (step S309). Thereafter, the base station apparatus 1 performs switching of necessary setting for signal reception in accordance with whether or not reception is NOMA reception (step S310), and performs reception processing (step S311).

In addition, it is assumed that downlink transmission data is generated in the base station apparatus 1 (step S312). The base station apparatus 1 determines whether or not to perform NOMA transmission, if such determination is necessary (step S313). Here, in a case where NOMA transmission is to be performed, the base station apparatus 1 performs switching of necessary setting or the like for signal transmission to setting for NOMA transmission (step S314), and transmits a signal to the terminal apparatus 2 (step S315). The terminal apparatus 2 having received a downlink transmission signal determines whether or not to perform NOMA reception, if such determination is necessary (step S316). Thereafter, the terminal apparatus 2 performs switching of necessary setting or the like for signal reception in accordance with whether or not reception is NOMA reception (step S317), and performs reception processing (step S318).

The basic sequence of the base station apparatus 1 or the terminal apparatus 2 according to the present embodiment has been described above. Next, specific examples of setting or the like to be switched by the base station apparatus 1 or the terminal apparatus 2 for transmission or reception in accordance with whether communication is NOMA communication or OMA communication. It should be noted that processing described below may be executed by the control section 103 in the base station apparatus 1 and may be executed by the control section 203 in the terminal apparatus 2.

(1. DCI Contents)
(1-1. Resource Allocation)

For example, in a case of NOMA using functions such as Spreading and Repetition, a large number of transmission resources are considered necessary, as compared with OMA. Accordingly, it is considered that the base station apparatus 1 or the terminal apparatus 2 efficiently allocates resources by setting a larger resource allocation unit in NOMA than that in OMA. In a case where the resource allocation unit is larger than that in OMA, it is considered possible to reduce the number of bits of which a notification is issued with use of Resource Allocation.

For example, the base station apparatus 1 or the terminal apparatus 2 may use all bits for allocation of frequency and time resources in OMA, and may use some of bits for allocation of frequency and time resources and use the remaining bits for another application such as allocation of MA signatures in NOMA. In the case of NOMA, it is possible to reduce the number of bits of a field for a notification of Resource Allocation. For example, in a case where eight bits are used for allocation of frequency and time resources in OMA, in NOMA, only four bits may be used for allocation of frequency and time resources, and the remaining four bits may be used for allocation of MA signatures.

(1-2. Modulation and Coding Scheme (MCS))

In NOMA, a plurality of different signals is multiplexed on non-orthogonal axes, and is transmitted. A reception device has to decode a desired signal by cancellation of a signal, which is interference, from the multiplexed signal, or the like. Accordingly, in NOMA, it is considered to further enhance tolerance to an interference signal by limiting of a Modulation Order or a Code rate to a low value, or the like. Further, it is considered that limiting the value makes it possible to reduce the number of bits of which a notification is issued. For example, in NOMA, it is possible to use a modulation scheme such as QPSK (Quadrature Phase Shift Keying) and 16QAM (Quadrature Amplitude Modulation).

For example, the base station apparatus 1 or the terminal apparatus 2 may use all bits for MCS allocation in OMA, and may use some of the bits for MCS allocation and use the remaining bits for another application such as MA signature allocation in NOMA. In the case of NOMA, it is possible to reduce the number of bits of a field for a notification of an MCS.

(1-3. CBG Information to be Transmitted on Uplink or Downlink)

CBG information to be transmitted on the Uplink or the Downlink may be referred to as CBG Transmission information (CBGTI), for example. Hereinafter, for the sake of convenience, the CBG information is referred to as CBGTI. In NOMA, a plurality of different signals is multiplexed on non-orthogonal axes, and is transmitted. A reception device has to decode a desired signal by cancellation of a signal, which is interference, from the multiplexed signal, or the like. Accordingly, in NOMA, the TB size may be made smaller than that in OMA to relatively decrease the Code rate. In NOMA, relatively decreasing the Code rate as compared with that in OMA makes it possible to further enhance tolerance to an interference signal. Further, in NOMA, it considered that the number of CBGs is reduced by making the TB size smaller than that in OMA, which makes it possible to reduce the number of bits of the CBGTI.

For example, the base station apparatus 1 or the terminal apparatus 2 may use a field used for a notification of the CBGTI in OMA as a field for a notification of another application such as MA signature allocation in NOMA. In addition, the base station apparatus 1 or the terminal apparatus 2 may use all bits for CBGTI in OMA, and may use some of the bits for CBGTI and use the remaining bits for another application such as MA signature allocation in NOMA. In addition, the base station apparatus 1 or the terminal apparatus 2 may cause a field of CBGTI to exist in OMA and not to exist in NOMA. (1-4. Information Regarding Whether or not to HARQ-Combine Transmitted CBG)

Whether or not to HARQ-combine transmitted CBG translates to, for example, whether or not to clear a reception buffer. In addition, information regarding whether or not to HARQ-combine transmitted CBG may be referred to as CBG flushing out information (CBGFI). Hereinafter, for the sake of convenience, the information is referred to as CB GFI.

In NOMA, a plurality of different signals is multiplexed on non-orthogonal axes, and is transmitted. A reception device has to decode a desired signal by cancellation of a signal, which is interference, from the multiplexed signal, or the like. Accordingly, in NOMA, the TB size may be made smaller than that in OMA to relatively decrease the Code rate. In NOMA, relatively decreasing the Code rate as compared with that in OMA makes it possible to further enhance tolerance to an interference signal. Further, in NOMA, it considered that the number of CBGs is reduced by making the TB size smaller. Accordingly, it is considered that it is possible to eliminate bits of CBGFI by reducing the number of bits of the CBGTI or always performing TB-based transmission in NOMA transmission.

For example, the base station apparatus 1 or the terminal apparatus 2 may use a field used for a notification of the CBGTI in OMA as a field for a notification of another application such as MA signature allocation in NOMA. In addition, for example, the base station apparatus 1 or the terminal apparatus 2 may cause the field of CBGTI to exist in OMA and not to exist in NOMA.

(1-5. Flag for OMA/NOMA Discrimination)

In a case where switching between OMA and NOMA is dynamically performed, there is a possibility that DCI contents differ between OMA transmission and NOMA transmission. In this case, causing the DCI contents to have the same information size allows the DCI contents to have the same DCI format, which makes it possible to reduce the number of times of blind decoding of DCI.

In a case where the different DCI contents have the same DCI format, it is necessary to determine whether the DCI contents are OMA contents or NOMA contents. Accordingly, the base station apparatus 1 or the terminal apparatus 2 may prepare a flag for discrimination between OMA and NOMA in DCI. FIG. 20 is an explanatory diagram illustrating an example of a region of a flag for discrimination between OMA and NOMA. The base station apparatus 1 or the terminal apparatus 2 may set the region of the flag for discrimination between OMA and NOMA in a case where NOMA is set, and may not set the region of the flag for discrimination between OMA and NOMA in a case where NOMA is not set. In addition, in a case where NOMA is set, the base station apparatus 1 or the terminal apparatus 2 may newly provide a region of a bit (for example, one bit) for discrimination.

(2. TBS Table or Mathematical Expression for NOMA)

The base station apparatus 1 or the terminal apparatus 2 may set a different TBS table or mathematical expression that causes the TB size (TBS) determined by a TBS Index and the Number of allocated resource blocks to have a smaller (larger) value in the case of NOMA, as compared with that in OMA. It should be noted that in LTE, the TBS Table is described in Table 7.1.7.2.1-1 of TS36.213, or the like. Table 1 is an example of a TBS Table for OMA, and Table 2 is an example of a TBS Table for NOMA.

TABLE 1

| | $N_{PRB}$ | | | | | |
|---|---|---|---|---|---|---|
| $I_{TBS}$ | 1 | 2 | 3 | 4 | 5 | ... |
| 0 | 16 | 32 | 56 | 88 | 120 | ... |
| 1 | 24 | 56 | 88 | 144 | 176 | ... |
| 2 | 32 | 72 | 144 | 176 | 208 | ... |
| 3 | 40 | 104 | 176 | 208 | 256 | ... |
| ... | ... | ... | ... | ... | ... | ... |

(Table 1: Example of TBS Table for OMA)

TABLE 2

| | $N_{PRB}$ | | | | | |
|---|---|---|---|---|---|---|
| $I_{TBS}$ | 1 | 2 | 3 | 4 | 5 | ... |
| 0 | 8 | 16 | 28 | 44 | 60 | ... |
| 1 | 12 | 28 | 44 | 72 | 88 | ... |
| 2 | 16 | 36 | 72 | 88 | 104 | ... |
| 3 | 20 | 52 | 88 | 104 | 128 | ... |
| ... | ... | ... | ... | ... | ... | ... |

(Table 2: Example of TBS Table for NOMA)

In addition, the base station apparatus 1 or the terminal apparatus 2 may calculate a TBS for NOMA by an expression that calculates the TBS for NOMA from the table for OMA. For example, the base station apparatus 1 or the terminal apparatus 2 may calculate the TBS for NOMA by the following mathematical expression.

(TB size)=(value of TBS table for OMA)*(variable or constant for NOMA)

In addition, the base station apparatus 1 or the terminal apparatus 2 may calculate the TBS for NOMA by adding a term or parameter for NOMA to an expression for calculation of the TBS for OMA. The parameter for NOMA may be determined in accordance with, for example, a value of a Spreading Factor or the like. For example, the base station apparatus 1 or the terminal apparatus 2 may calculate the TBS for NOMA by the following expression.

(TB size)=(computational expression for OMA)* (variable or constant for NOMA)

An example of the computational expression for OMA may be an expression including $N_{PRB}$ and $I_{TBS}$, for example. For example, in a case where the Spreading Factor (SF) is equal to 2 (which means spreading by twice), the base station apparatus 1 or the terminal apparatus 2 may set the TB size to (the variable for NOMA)=1/SF=1/2.

(3. MCS Table or Mathematical Expression for NOMA)

The base station apparatus 1 or the terminal apparatus 2 may prepare a different MCS Table or mathematical expression that causes modulation determined by an MCS Index in NOMA communication to become low-order or equal-order modulation as compared with that in OMA. Table 3 is an example of an MCS Table for OMA. It should be noted that in a case of LTE, the MCS Table is described in Table 7.1.7.1-1 of TS36.213, or the like.

TABLE 3

| MCS Index $I_{MCS}$ | Modulation Order $Q_m$ | TBS Index $I_{TBS}$ |
|---|---|---|
| 0 | 1 | 0 |
| 1 | 1 | 1 |
| 2 | 1 | 2 |
| 3 | 1 | 3 |
| 4 | 2 | 0 |
| 5 | 2 | 1 |
| 6 | 2 | 2 |
| 7 | 2 | 3 |
| 8 | ... | ... |

(Table 3: Example of MCS Table for NOMA)

An example of a computational expression may be a mathematical expression such as (MCS for NOMA)=(MCS for OMA)*(variable or constant for NOMA).

(4. Codebook Index Table or Mathematical Expression for NOMA)

The base station apparatus 1 or the terminal apparatus 2 may change a table of a Precoding matrix determined by a Codebook Index to a table for NOMA in NOMA communication. It should be noted that a Precoding matrix in the case of LTE is described in Table 5.3.3A.2-1 of TS36.211, or the like. In addition, the base station apparatus 1 or the terminal apparatus 2 may change the Precoding matrix determined by the Codebook Index to a matrix for NOMA. In addition, the base station apparatus 1 or the terminal apparatus 2 may determine a Precoding matrix for NOMA by a mathematical expression. In a case where the Precoding matrix for NOMA is determined by the mathematical expression, for example, a mathematical expression such as (Precoding matrix for NOMA)=(Precoding matrix for OMA)*(matrix for NOMA) may be adopted.

(5. TB-Based or CBG-Based)

In a case where CBG-based transmission is not semi-statically set, the base station apparatus 1 or the terminal apparatus 2 may always perform TB-based transmission in both OMA transmission and NOMA transmission. In addition, in a case where CBG-based transmission is semi-statically set, the base station apparatus 1 or the terminal apparatus 2 may perform CBG-based transmission in OMA transmission and perform TB-based transmission in NOMA transmission.

(6. Control Resource Set or Resource of Search Space)

A Control Resource Set may be referred to as CORESET, control subband, or the like. Hereinafter, for the sake of convenience, the Control Resource Set is referred to as CORESET. The CORESET indicates resources including one or a plurality of Search Spaces that are to be blind-decoded by the terminal apparatus. FIG. 21 is an explanatory diagram illustrating an example of resources of the CORESET, the Search Space, and the DCI. FIG. 21 illustrates an example in which one CORESET, one Search Space, and one piece of DCI are included. The base station apparatus 1 sets the CORESET for the terminal apparatus 2. The terminal apparatus 2 calculates a resource position of the Search Space from the set resources and performs blind decoding on the Search Space to decode the DCI.

The base station apparatus 1 or the terminal apparatus 2 may issue each of a notification of a CORESET for OMA transmission and a notification of a CORESET for NOMA transmission in advance. FIG. 22 is an explanatory diagram of an example of resources of the CORESET, the Search Space, and the DCI. FIG. 22 illustrates an example of resources of the CORESET for OMA transmission, the CORESET for NOMA transmission, the Search Space, and the DCI. The base station apparatus 1 or the terminal apparatus 2 performs switching of the resources of the CORESET in accordance with whether transmission is OMA transmission or NOMA transmission, and receives the resources of the CORESET. In addition, the base station apparatus 1 or the terminal apparatus 2 find out, from the successfully received CORESET, whether transmission is OMA transmission or NOMA transmission. That is, the base station apparatus 1 or the terminal apparatus 2 finds out that transmission is OMA transmission in a case where the CORESET for OMA transmission is successfully received, and finds out that transmission is MONA transmission in a case where the CORESET for NOMA transmission is successfully received.

In addition, the base station apparatus 1 or the terminal apparatus 2 may perform blind decoding on a resource of a different Search Space in accordance with whether transmission is OMA transmission or NOMA transmission. FIG. 23 is an explanatory diagram of an example of resources of the CORESET, the Search Spaces, and the DCI. FIG. 23 illustrates an example of resources of the CORESET for OMA transmission, a Search Space for OMA transmission, a Search Space for NOMA transmission, and the DCI. In a case where the same CORESET is set for both OMA transmission and NOMA transmission, as illustrated in FIG. 23, a case where the Search Space for OMA transmission and the Search Space for NOMA transmission are further different in the CORESET is considered. The respective Search Spaces may be set in advance, or may be recognized by a computational expression. In a case where the Search Space for NOMA transmission is determined by a computational expression, for example, a mathematical expression such as (Search Space Resource Index for NOMA)=(Search Space Resource Index for OMA)*(variable or constant for NOMA) may be used.

(7. DMRS)

The base station apparatus 1 or the terminal apparatus 2 may switch a DMRS pattern between OMA transmission and NOMA transmission. That is, the base station apparatus 1 or the terminal apparatus 2 may have orthogonality between OMA transmission and NOMA transmission. For example, the base station apparatus 1 or the terminal apparatus 2 may allocate different Orthogonal Cover Codes (OCCs) to respective DMRSs of OMA transmission and NOMA transmission. In addition, the base station apparatus 1 or the terminal apparatus 2 may allocate different Cyclic Shift patterns to respective DMRSs of OMA transmission and NOMA transmission.

(8. HARQ Process Number or Number of HARQ Processes)

The base station apparatus 1 or the terminal apparatus 2 may switch a HARQ Process Number or the number of HARQ Processes between OMA transmission and NOMA transmission. FIG. 24 is an explanatory diagram illustrating an example of switching the HARQ Process Number between OMA transmission and NOMA transmission. In a case where there is a possibility that both OMA transmission and NOMA transmission are performed, the base station apparatus 1 or the terminal apparatus 2 may allocate HARQ Process Numbers #0 and #1 to OMA transmission and allocate HARQ Process Numbers #2 and #3 to NOMA transmission. FIG. 25 is an explanatory diagram illustrating an example of switching the number of HARQ Processes between OMA transmission and NOMA transmission. In a case where either OMA transmission or NOMA transmission is performed, the base station apparatus 1 or the terminal apparatus 2 may set the number of HARQ Processes in OMA transmission to 4 and set the number of HARQ Processes in NOMA transmission to 2, for example.

(9. Grant-based Transmission or Grant-free Transmission)

The base station apparatus 1 or the terminal apparatus 2 may switch whether to perform Grant-based transmission or Grant-free transmission in accordance with OMA transmission and NOMA transmission. For example, the base station apparatus 1 or the terminal apparatus 2 may perform switching such as switching to Grant-based transmission for OMA transmission and to Grant-free transmission for NOMA transmission. For example, the base station apparatus 1 or the terminal apparatus 2 may perform switching such as switching to Grant-based transmission for OMA transmission or NOMA transmission and always switching to Grant-free transmission for NOMA transmission. A notification of either OMA transmission or NOMA transmission in which Grant-based transmission is to be performed may be issued with use of the DCI, for example.

(10. CSI Feedback)

The base station apparatus 1 or the terminal apparatus 2 may switch CSI Feedback between OMA transmission and NOMA transmission. Examples of the CSI Feedback include a Channel Quality Indicator (CQI), a Precoding Matrix Indicator (PMI), a Rank Indicator (RI), and the like. In NOMA transmission, different signals are multiplexed on non-orthogonal axes, which causes interference between the signals. Accordingly, in NOMA transmission, a channel state is assumed to worsen, as compared with OMA transmission. Thus, in a case of NOMA transmission, the base station apparatus 1 or the terminal apparatus 2 may feed back a low CQI or a low Rank, as compared with OMA transmission. In the case of NOMA transmission, it is considered that a Precoding Matrix is different from that in OMA transmission. Accordingly, in the case of NOMA transmission, the base station apparatus 1 or the terminal apparatus 2 may feed back a PMI different from that in OMA transmission.

(11. Power Control)

The base station apparatus 1 or the terminal apparatus 2 may switch an expression of Power Control between OMA transmission and NOMA transmission. In addition, the base station apparatus 1 or the terminal apparatus 2 may switch whether to execute the Power Control for OMA transmission and NOMA transmission. Non-orthogonal multiplexing having a power difference is considered in accordance with a NOMA transmission scheme. Accordingly, in NOMA transmission, the base station apparatus 1 or the terminal apparatus 2 may use a different expression of the Power Control from that in OMA transmission, and may add a parameter in NOMA transmission to an expression of the Power Control in OMA transmission. In addition, the base station apparatus 1 or the terminal apparatus 2 may switch on or off the Power Control. This makes it possible for the terminal apparatus 2 to make a difference in received power in the base station apparatus 1 in a case where power is transmitted from the terminal apparatus 2 to the base station apparatus 1. The terminal apparatus 2 may switch a scheme of the Power Control in accordance with whether OMA transmission or NOMA transmission is to be performed.

(12. Initial Transmission or Retransmission)

The base station apparatus 1 or the terminal apparatus 2 may perform switching between initial transmission and retransmission in accordance with OMA transmission and NOMA transmission. For example, it is assumed that the base station apparatus 1 or the terminal apparatus 2 performs initial transmission in NOMA transmission. In a case where a receiver fails reception, the base station apparatus 1 or the terminal apparatus 2 may perform switching retransmission to OMA transmission. An orthogonal resource is used by setting retransmission to OMA transmission, which makes it possible to expect an improvement in reliability during retransmission.

(13. RNTI)

The base station apparatus 1 or the terminal apparatus 2 may switch an RNTI between OMA transmission and NOMA transmission. For example, it is assumed that DCI for OMA transmission and DCI for NOMA transmission have the same DCI format. In this case, as one of methods of differentiating between DCI for OMA transmission and DCI for NOMA transmission, a determination method from a CRC Scramble of the DCI is considered. For example, a transmission device may perform switching of the RNTI such as scrambling a CRC of DCI by an RNTI for OMA in the case of OMA transmission and scrambling the CRC of the DCI by an RNTI for NOMA in the case of NOMA transmission. A reception device having received the DCI decodes the DCI, and thereafter attempts to descramble the CRC by both the RNTI for OMA and the RNTI for NOMA, which makes it possible to determine whether transmission is OMA transmission or NOMA transmission from a success or failure of a CRC check.

In the examples described above, examples of switching between OMA transmission and NOMA transmission have been described; however, switching between types of NOMA transmission may be performed. Examples of such switching include switching between NOMA transmission using a function of Spreading and NOMA transmission or OMA transmission not using the function of Spreading, and the like. Here, a case where the function of Spreading is used is described as an example, but any function such as Interleave and Repetition may be used without limiting the function of spreading. In addition, examples in cases of the downlink and the uplink have been mainly described above, but are not limitative. The examples are applicable to a sidelink such as Device to Device (D2D) and communication with a relay terminal. In addition, only one of the examples described above may be applied, or a plurality of methods in the examples described above may be combined for execution. In addition, the present technology is not limited to the examples described above.

2. APPLICATION EXAMPLES

The technology according to the present disclosure is applicable to various products. For example, the base station apparatus 1 may be achieved as any type of eNB (evolved Node B) such as a macro eNB or a small eNB. The small eNB may be an eNB such as a pico eNB, a micro eNB, or a home (femto) eNB that covers a cell smaller than a macro cell. Instead, the base station apparatus 1 may be achieved as another type of base station such as a NodeB or a BTS (Base Transceiver Station). The base station apparatus 1 may include a main entity (also referred to as base station apparatus) that controls wireless communication, and one or more RRHs (Remote Radio Heads) disposed in places different from the place of the main entity. In addition, various types of terminals to be described below may operate as the base station apparatus 1 by executing a base station function temporarily or permanently.

In addition, for example, the terminal apparatus 2 may be achieved as a mobile terminal such as a smartphone, a tablet PC (Personal Computer), a notebook PC, a portable game terminal, a portable/dongle mobile router, or a digital camera, or an onboard terminal such as a car navigation apparatus. In addition, the terminal apparatus 2 may be achieved as a terminal (also referred to as MTC (Machine Type Communication) terminal) that performs M2M (Machine To Machine) communication. Further, the terminal apparatus 2 may include a wireless communication module (e.g., integrated circuit module including one die) mounted on any of these terminals.

<2.1. Application Examples for Base Station Apparatus>

First Application Example

FIG. 26 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be coupled to each other via an RF cable.

Each of the antennas 810 includes a single or a plurality of antenna elements (e.g., a plurality of antenna elements included in a MIMO antenna), and is used for the base station apparatus 820 to transmit and receive wireless signals. The eNB 800 may include the plurality of antennas 810 as illustrated in FIG. 26, and the plurality of respective antennas 810 may correspond, for example, to a plurality of frequency bands used by the eNB 800. It should be noted that FIG. 26 illustrates an example in which the eNB 800 includes the plurality of antennas 810, but the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of a higher layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors, and transfer the generated bundled packet. In addition, the controller 821 may have a logical function of executing control such as radio resource control (Radio Resource Control), radio bearer control (Radio Bearer Control), mobility management (Mobility Management), admission control (Admission Control), or scheduling (Scheduling). In addition, the control may be executed in cooperation with a nearby eNB or a core network node. The memory 822 includes a RAM and a ROM, and stores a program executed by the controller 821 and various kinds of control data (e.g., terminal list, transmission power data, scheduling data, and the like).

The network interface 823 is a communication interface for coupling the base station apparatus 820 to the core network 824. The controller 821 may communicate with a core network node or another eNB via the network interface 823. In this case, the eNB 800 and the core network node or the other eNB may be coupled to each other through a logical interface (e.g., S1 interface or X2 interface). The network interface 823 may be a wired communication interface or a wireless communication interface for wireless backhaul. In a case where the network interface 823 is a wireless communication interface, the network interface 823 may use a higher frequency band for wireless communication than a frequency band used by the wireless communication interface 825.

The wireless communication interface 825 supports any cellular communication scheme such as LTE (Long Term Evolution) or LTE-Advanced, and provides wireless coupling to a terminal positioned within the cell of the eNB 800 via the antenna 810. The wireless communication interface 825 may typically include a base band (BB) processor 826, an RF circuit 827, and the like. The BB processor 826 may perform, for example, encoding/decoding, modulation/demodulation, multiplexing/demultiplexing, and the like, and executes various signal processing of each of layers (e.g., L1, MAC (Medium Access Control), RLC (Radio Link Control), and PDCP (Packet Data Convergence Protocol)). The BB processor 826 may have a portion or all of the logical functions described above instead of the controller 821. The BB processor 826 may be a module including a memory having a communication control program stored therein, a processor to execute the program, and a related circuit, and the function of the BB processor 826 may be modifiable by updating the program described above. In addition, the module described above may be a card or blade to be inserted into a slot of the base station apparatus 820, or a chip mounted on the card or blade described above. Meanwhile, the RF circuit 827 may include a mixer, a filter, an amplifier, and the like, and transmits and receives wireless signals via the antenna 810.

The wireless communication interface 825 may include the plurality of BB processors 826 as illustrated in FIG. 26, and the plurality of respective BB processors 826 may correspond, for example, to a plurality of frequency bands used by the eNB 800. In addition, the wireless communication interface 825 may include the plurality of RF circuits 827 as illustrated in FIG. 26, and the plurality of respective RF circuits 827 may correspond, for example, to a plurality of antenna elements. It should be noted that FIG. 26 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 26, the higher-layer processing section 101, the control section 103, the reception section 105, and/or the transmission section 107 described with reference to FIG. 6 may be implemented in the wireless communication interface 825 (e.g., BB processor 826 and/or RF circuit 827), the controller 821, and/or the network interface 823. For example, the wireless communication interface 825, the controller 821, and/or the network interface 823 may transmit first control information and second control information, and receive a control information request and transmit corresponding third control information. For example, functions for performing these operations may be implemented in a processor included in the wireless communication interface 825. The eNB 800, the base station apparatus 820, or the module described above may be provided as an apparatus that performs such an operation, or a program for causing a processor to perform the operations described above may be provided. In addition, a readable recording medium having the above-described program recorded thereon may be provided. In addition, the transmission/reception antenna 109 may be implemented in the antenna 810.

Second Application Example

FIG. 27 is a block diagram illustrating a second example of a schematic configuration of an eNB to which the technology according to the present disclosure may be applied. An eNB 830 includes one or more antennas 840, a base station apparatus 850, and an RRH 860. Each antenna 840 and the RRH 860 may be coupled to each other via an RF cable. In addition, the base station apparatus 850 and the RRH 860 may be coupled to each other through a high-speed line such as an optical fiber cable.

Each of the antennas 840 includes a single or a plurality of antenna elements (e.g., a plurality of antenna elements included in a MIMO antenna), and is used for the RRH 860 to transmit and receive wireless signals. The eNB 830 may include a plurality of antennas 840 as illustrated in FIG. 27, and the plurality of respective antennas 840 may correspond, for example, to a plurality of frequency bands used by the eNB 830. It should be noted that FIG. 27 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a coupling interface 857. The controller 851, the memory 852, and the network interface 853 are similar to the controller 821, the memory 822, and the network interface 823 described with reference to FIG. 26.

The wireless communication interface 855 supports any cellular communication scheme such as LTE or LTE-Advanced, and provides wireless coupling to a terminal positioned in a sector corresponding to the RRH 860 via the RRH 860 and the antenna 840. The wireless communication interface 855 may typically include a BB processor 856 and the like. The BB processor 856 is similar to the BB processor 826 described with reference to FIG. 26 except that the BB processor 856 is coupled to an RF circuit 864 of the RRH 860 via the coupling interface 857. The wireless communication interface 855 may include the plurality of BB processors 856 as illustrated in FIG. 27, and the plurality of respective BB processors 856 may correspond, for example, to a plurality of frequency bands used by the eNB 830. It should be noted that FIG. 27 illustrates an example in which the wireless communication interface 855 includes the plurality of BB processors 856, but the wireless communication interface 855 may include the single BB processor 856.

The coupling interface 857 is an interface for coupling the base station apparatus 850 (wireless communication interface 855) to the RRH 860. The coupling interface 857 may be a communication module for communication on the above-described high-speed line that couples the base station apparatus 850 (wireless communication interface 855) and the RRH 860 to each other.

In addition, the RRH 860 includes a coupling interface 861 and a wireless communication interface 863.

The coupling interface 861 is an interface for coupling the RRH 860 (wireless communication interface 863) to the base station apparatus 850. The coupling interface 861 may be a communication module for communication on the high-speed line described above.

The wireless communication interface 863 transmits and receives wireless signals via the antenna 840. The wireless communication interface 863 may typically include the RF circuit 864 and the like. The RF circuit 864 may include a mixer, a filter, an amplifier, and the like, and transmits and receives wireless signals via the antenna 840. The wireless communication interface 863 may include the plurality of RF circuits 864 as illustrated in FIG. 27, and the plurality of respective RF circuits 864 may correspond, for example, to a plurality of antenna elements. It should be noted that FIG. 27 illustrates an example in which the wireless communication interface 863 includes the plurality of RF circuits 864, but the wireless communication interface 863 may include the single RF circuit 864.

In the eNB 830 illustrated in FIG. 27, the higher-layer processing section 101, the control section 103, the reception section 105, and/or the transmission section 107 described with reference to FIG. 6 may be implemented in the wireless communication interface 855, the wireless communication interface 863 (e.g., BB processor 856 and/or RF circuit 864), the controller 851, and/or the network interface 853. For example, the wireless communication interface 855, the wireless communication interface 863, the controller 851, and/or the network interface 853 may transmit first control information and second control information, and receive a control information request and transmit corresponding third control information. For example, functions for performing these operations may be implemented in a processor included in the wireless communication interface 855 and/or the wireless communication interface 863. The eNB 830, the base station apparatus 850, or the module described above may be provided as an apparatus that performs such an operation, or a program for causing a processor to perform the operations described above may be provided. In addition, a readable recording medium having the above-described program recorded thereon may be provided. In addition, the transmission/reception antenna 109 may be implemented in the antenna 840.

<3.2. Application Examples for Terminal Apparatus>

First Application Example

FIG. 28 is a block diagram illustrating an example of a schematic configuration of a smartphone 900 to which the technology according to the present disclosure may be applied. The smartphone 900 includes a processor 901, a memory 902, a storage 903, an external coupling interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a SoC (System on Chip), and controls functions of an application layer and other layers of the smartphone 900. The memory 902 includes a RAM and a ROM, and stores a program to be executed by the processor 901, and data. The storage 903 may include a storage medium such as a semiconductor memory or a hard disk. The external coupling interface 904 is an interface for coupling an externally attached device such as a memory card or a USB (Universal Serial Bus) device to the smartphone 900.

The camera 906 includes, for example, an imaging element such as a CCD (Charge Coupled Device) or a CMOS (Complementary Metal Oxide Semiconductor), and generates a captured image. The sensor 907 may include a sensor group including, for example, a positioning sensor, a gyro sensor, a geomagnetic sensor, an acceleration sensor, and the like. The microphone 908 converts a sound that is inputted into the smartphone 900 to a sound signal. The input device 909 includes, for example, a touch sensor that detects a touch onto a screen of the display device 910, a keypad, a keyboard, a button, a switch, or the like, and receives an operation or an information input from a user. The display device 910 includes a screen such as a liquid crystal display (LCD) or an organic light-emitting diode (OLED) display, and displays an output image of the smartphone 900. The speaker 911 converts the sound signal that is outputted from the smartphone 900 to a sound.

The wireless communication interface 912 supports any cellular communication scheme such as LTE or LTE-Advanced, and executes wireless communication. The wireless communication interface 912 may typically include a BB processor 913, an RF circuit 914, and the like. The BB processor 913 may perform, for example, encoding/decoding, modulation/demodulation, multiplexing/demultiplexing, and the like, and executes various kinds of signal processing for wireless communication. Meanwhile, the RF circuit 914 may include, for example, a mixer, a filter, an amplifier, and the like, and transmits and receives wireless signals via the antenna 916. The wireless communication interface 912 may be a one-chip module that has the BB processor 913 and the RF circuit 914 integrated thereon. The wireless communication interface 912 may include a plurality of BB processors 913 and a plurality of RF circuits 914 as illustrated in FIG. 28. It should be noted that FIG. 28 illustrates an example in which the wireless communication interface 912 includes the plurality of BB processors 913 and the plurality of RF circuits 914, but the wireless communication interface 912 may include the single BB processor 913 or the single RF circuit 914.

Further, in addition to the cellular communication scheme, the wireless communication interface 912 may support any other type of wireless communication scheme such as a short-distance wireless communication scheme, a near field wireless communication scheme, or a wireless LAN (Local Area Network) scheme. In that case, the wireless communication interface 912 may include the BB processor 913 and the RF circuit 914 for each wireless communication scheme.

Each of the antenna switches 915 switches coupling destinations of the antennas 916 between a plurality of circuits (e.g., circuits for different wireless communication schemes) included in the wireless communication interface 912.

Each of the antennas 916 includes a single or a plurality of antenna elements (e.g., a plurality of antenna elements included in a MIMO antenna), and is used for the wireless communication interface 912 to transmit and receive wireless signals. The smartphone 900 may include a plurality of antennas 916 as illustrated in FIG. 28. It should be noted that FIG. 28 illustrates an example in which the smartphone 900 includes the plurality of antennas 916, but the smartphone 900 may include the single antenna 916.

Further, the smartphone 900 may include the antenna 916 for each wireless communication scheme. In that case, the antenna switches 915 may be omitted from the configuration of the smartphone 900.

The bus 917 couples the processor 901, the memory 902, the storage 903, the external coupling interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 28 via a power supply line that is partially illustrated in the diagram as a dashed line. For example, the auxiliary controller 919 operates a minimally necessary function of the smartphone 900 in a sleep mode.

In the smartphone 900 illustrated in FIG. 28, the higher-layer processing section 201, the control section 203, the reception section 205, and/or the transmission section 207 described with reference to FIG. 7 may be implemented in the wireless communication interface 912 (e.g., RF circuit 914 and/or BB processor 913), the processor 901, and/or the auxiliary controller 919. For example, the wireless communication interface 912, the processor 901, and/or the auxiliary controller 919 may receive the first control information and the second control information, or may transmit the control information request and receive the corresponding third control information. For example, functions for performing these operations may be implemented in a processor included in the wireless communication interface 912. The smartphone 900 or the module described above may be provided as an apparatus that performs such an operation, or a program for causing a processor to perform the operations described above may be provided. In addition, a readable recording medium having the above-described program recorded thereon may be provided. In addition, the transmission/reception antenna 209 may be implemented in the antenna 916.

Second Application Example

FIG. 29 is a block diagram illustrating an example of a schematic configuration of a car navigation apparatus 920 to which the technology according to the present disclosure may be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and other functions of the car navigation apparatus 920. The memory 922 includes a RAM and a ROM, and stores a program to be executed by the processor 921, and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor, and the like. The data interface 926 is, for example, coupled to an in-vehicle network 941 via an unillustrated terminal, and acquires data such as vehicle speed data generated on the vehicle side.

The content player 927 reproduces a content stored in a storage medium (e.g., CD or DVD) to be inserted into the storage medium interface 928. The input device 929 includes, for example, a touch sensor that detects a touch onto a screen of the display device 930, a button, a switch, or the like, and receives an operation or an information input from a user. The display device 930 includes a screen such as an LCD or an OLED display, and displays an image of the navigation function or the content to be reproduced. The speaker 931 outputs a sound of the navigation function or the content to be reproduced.

The wireless communication interface 933 supports any cellular communication scheme such as LTE or LTE-Advanced, and executes wireless communication. The wireless communication interface 933 may typically include a BB processor 934, an RF circuit 935, and the like. The BB processor 934 may perform, for example, encoding/decoding, modulation/demodulation, multiplexing/demultiplexing, and the like, and executes various kinds of signal processing for wireless communication. Meanwhile, the RF circuit 935 may include, for example, a mixer, a filter, an amplifier, and the like, and transmits and receives wireless signals via the antenna 937. The wireless communication interface 933 may also be a one-chip module that has the BB processor 934 and the RF circuit 935 integrated thereon. The wireless communication interface 933 may include a plurality of BB processors 934 and a plurality of RF circuits 935 as illustrated in FIG. 29. It should be noted that FIG. 29 illustrates an example in which the wireless communication interface 933 includes the plurality of BB processors 934 and the plurality of RF circuits 935, but the wireless communication interface 933 may include the single BB processor 934 or the single RF circuit 935.

Further, in addition to the cellular communication scheme, the wireless communication interface 933 may support any other type of wireless communication scheme such as a short-distance wireless communication scheme, a near field wireless communication scheme, or a wireless LAN scheme. In that case, the wireless communication interface 933 may include the BB processor 934 and the RF circuit 935 for each wireless communication scheme.

Each of the antenna switches 936 switches coupling destinations of the antennas 937 between a plurality of circuits (e.g., circuit for different wireless communication schemes) included in the wireless communication interface 933.

Each of the antennas 937 includes a single or a plurality of antenna elements (e.g., a plurality of antenna elements included in a MIMO antenna), and is used for the wireless communication interface 933 to transmit and receive wireless signals. The car navigation apparatus 920 may include a plurality of antennas 937 as illustrated in FIG. 29. It should be noted that FIG. 29 illustrates an example in which the car navigation apparatus 920 includes the plurality of antennas 937, but the car navigation apparatus 920 may include the single antenna 937.

Further, the car navigation apparatus 920 may include the antenna 937 for each wireless communication scheme. In that case, the antenna switches 936 may be omitted from the configuration of the car navigation apparatus 920.

The battery 938 supplies power to each block of the car navigation apparatus 920 illustrated in FIG. 29 via a power supply line that is partially illustrated in the diagram as a dashed line. In addition, the battery 938 accumulates power supplied from the vehicle side.

In the car navigation apparatus 920 illustrated in FIG. 29, the higher-layer processing section 201, the control section 203, the reception section 205, and/or the transmission section 207 described with reference to FIG. 7 may be implemented in the wireless communication interface 933 (e.g., RF circuit 935 and/or BB processor 934) and/or the processor 921. For example, the wireless communication interface 933 and/or the processor 921 may receive the first control information and the second control information, or may transmit the control information request and receive the corresponding third control information. For example, functions for performing these operations may be implemented in a processor included in the wireless communication interface 933. The car navigation apparatus 920 or the module described above may be provided as an apparatus that performs such an operation, or a program for causing a processor to perform the operations described above may be provided. In addition, a readable recording medium having the above-described program recorded thereon may be provided. In addition, the transmission/reception antenna 209 may be implemented in the antenna 937.

In addition, the technology according to the present disclosure may also be achieved as an in-vehicle system (or vehicle) 940 including one or more blocks of the car navigation apparatus 920 described above, the in-vehicle network 941, and a vehicle-side module 942. The vehicle-side module 942 generates vehicle data such as vehicle speed, engine speed, and trouble information, and outputs the generated data to the in-vehicle network 941.

It should be noted that the eNB described in the description above may be a gNB (gNodeB or next Generation NodeB).

3. CONCLUSION

As described above, according to the embodiment of the present disclosure, it is possible to provide the base station apparatus 1 and the terminal apparatus 2 that make it possible to perform wireless communication more efficiently by performing switching of setting or the like for transmission or reception in accordance with whether to execute NOMA transmission or OMA transmission.

The respective steps in the processing executed by each apparatus described herein do not necessarily have to be performed chronologically in the order described as a sequence diagram or a flowchart. For example, the respective steps in the processing executed by each apparatus may be processed in order different from the order described as a flowchart, or may be processed in parallel.

In addition, it is possible to fabricate a computer program for causing hardware such as a CPU, a ROM, and a RAM built in each apparatus to implement functions similar to those of the components of each apparatus described above. In addition, it is possible to provide a storage medium having the computer program stored therein. In addition, configuring each of the functional blocks illustrated in the functional block diagrams by hardware makes it possible to allow the hardware to achieve a series of processes.

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure may arrive at various alterations and modifications within the scope of the technical idea described in the appended claims, and it is understood that such alterations and modifications naturally fall within the technical scope of the present disclosure.

Furthermore, the effects described herein are merely illustrative and exemplary, and not limitative. That is, the technology according to the present disclosure may exert other effects that are apparent to those skilled in the art from the description herein, in addition to the above-described effects or in place of the above-described effects.

It should be noted that the following configurations also fall within the technical scope of the present disclosure.

(1)

A wireless communication apparatus including:

a communication section that performs wireless communication; and a control section that selects setting to be used for transmission control or reception control by the communication section in accordance with whether the wireless communication is non-orthogonal multiple access or orthogonal multiple access.

(2)

The wireless communication apparatus according to (1), in which the control section selects, as the setting, setting regarding a parameter to be used for the transmission control or the reception control.

(3)

The wireless communication apparatus according to (2), in which the control section selects, as the setting, setting regarding a parameter in downlink control information.

(4)

The wireless communication apparatus according to (3), in which the control section selects, as the setting, setting regarding allocation of resources in the downlink control information.

(5)

The wireless communication apparatus according to (3), in which the control section selects, as the setting, setting regarding a flag, in the downlink control information, that determines whether the wireless communication is non-orthogonal multiple access or orthogonal multiple access.

(6)

The wireless communication apparatus according to (3), in which the control section selects, as the setting, setting regarding a transport block size.

(7)

The wireless communication apparatus according to (6), in which, in a case where the wireless communication is the non-orthogonal multiple access, the control section adds setting for the non-orthogonal multiple access to the setting regarding the transport block size in a case where the wireless communication is the orthogonal multiple access.

(8)

The wireless communication apparatus according to (1), in which the control section selects, as the setting, setting regarding a transmission scheme in the wireless communication.

(9)

The wireless communication apparatus according to (8), in which, in a case where the wireless communication is the non-orthogonal multiple access, the control section selects, as the setting, a transmission scheme without necessity of prior approval by an apparatus that is a partner of the wireless communication.

(10)

The wireless communication apparatus according to (8), in which the control section selects, as the setting, setting regarding a transmission unit in the wireless communication.

(11)

The wireless communication apparatus according to (10), in which, in a case where the wireless communication is the non-orthogonal multiple access, the control section selects a transmission scheme in which the transmission unit in the wireless communication is a transport block unit.

(12)

The wireless communication apparatus according to (1), in which the control section selects, as the setting, setting regarding a resource to be used for the transmission control or the reception control.

(13)

The wireless communication apparatus according to (12), in which the control section notifies an apparatus that is a partner of the wireless communication of a resource set to be used for the non-orthogonal multiple access or the orthogonal multiple access in the wireless communication in advance.

(14)

The wireless communication apparatus according to any one of (1) to (13), in which the control section determines whether or not to perform the non-orthogonal multiple access.

(15)

The wireless communication apparatus according to (14), in which the control section determines whether or not to perform the non-orthogonal multiple access from a resource set having been successfully received.

(16)

The wireless communication apparatus according to (14), in which the control section determines whether or not to perform the non-orthogonal multiple access on the basis of a result of blind decoding on a search space.

(17)

A wireless communication method to be executed by a processor, the method including:
performing wireless communication; and
switching setting to be used for transmission control or reception control in the wireless communication in accordance with whether the wireless communication is non-orthogonal multiple access or orthogonal multiple access.

(18)

A computer program that causes a computer to execute:
performing wireless communication; and
switching setting to be used for transmission control or reception control in the wireless communication in accordance with whether the wireless communication is non-orthogonal multiple access or orthogonal multiple access.

REFERENCE SIGNS LIST

1: base station apparatus
2: terminal apparatus

The invention claimed is:
1. A wireless communication apparatus, comprising:
a communication section configured to perform wireless communication; and
a control section configured to select a setting for transmission control or reception control by the communication section based on the wireless communication is one of a non-orthogonal multiple access or an orthogonal multiple access, wherein the setting includes:
a setting associated with a transport block size, wherein the transport block size for the non-orthogonal multiple access is smaller than the transport block size for the orthogonal multiple access; and
a setting regarding a resource allocation unit associated with allocation of resources, wherein the resource allocation unit for the non-orthogonal multiple access is larger than the resource allocation unit for the orthogonal multiple access.

2. The wireless communication apparatus according to claim 1, wherein the control section is further configured to select, as the setting, a setting regarding parameters in downlink control information.

3. The wireless communication apparatus according to claim 2, wherein the control section is further configured to select, as the setting, a setting regarding the allocation of resources in the downlink control information.

4. The wireless communication apparatus according to claim 2, wherein
the control section is further configured to select, as the setting, a setting regarding a flag in the downlink control information, and
the flag indicates that the wireless communication is one of the non-orthogonal multiple access or the orthogonal multiple access.

5. The wireless communication apparatus according to claim 1, wherein the control section is further configured to select, as the setting, a setting regarding a transmission scheme in the wireless communication.

6. The wireless communication apparatus according to claim 5, wherein based on the wireless communication is the non-orthogonal multiple access, the control section is further configured to select, as the setting, the transmission scheme without prior approval by an apparatus that is a partner of the wireless communication.

7. The wireless communication apparatus according to claim 5, wherein the control section is further configured to select, as the setting, a setting regarding a transmission unit in the wireless communication.

8. The wireless communication apparatus according to claim 7, wherein the control section is further configured to:
select, based on the wireless communication is the non-orthogonal multiple access, the transmission scheme as a Transport Block (TB) based transmission in which the transmission unit is a transport block unit; and
select, based on the wireless communication is the orthogonal multiple access, the transmission scheme as a CBG (Code Block Group) based transmission in which the transmission unit is a code block.

9. The wireless communication apparatus according to claim 1, wherein the control section is further configured to select, as the setting, a setting regarding a resource for the transmission control or the reception control.

10. The wireless communication apparatus according to claim 9, wherein the control section is further configured to notify, in advance, an apparatus that is a partner of the wireless communication with a resource set to be used for the non-orthogonal multiple access or the orthogonal multiple access in the wireless communication.

11. The wireless communication apparatus according to claim 1, wherein the control section is further configured to determine to perform the non-orthogonal multiple access from a resource set having been successfully received.

12. The wireless communication apparatus according to claim 1, wherein the control section is further configured to determine to perform the non-orthogonal multiple access based on a result of blind decoding on a search space.

13. A wireless communication method, comprising:
performing wireless communication; and
selecting a setting for transmission control or reception control in the wireless communication, wherein the setting is selected based on the wireless communication is one of a non-orthogonal multiple access or an orthogonal multiple access, and wherein the setting includes:
- a setting associated with a transport block size, wherein the transport block size for the non-orthogonal multiple access is smaller than the transport block size for the orthogonal multiple access; and
- a setting regarding a resource allocation unit associated with allocation of resources, wherein the resource allocation unit for the non-orthogonal multiple access is larger than the resource allocation unit for the orthogonal multiple access.

14. A non-transitory computer-readable medium having stored thereon, computer-executable instructions which, when executed by a processor, cause the processor to execute operations, the operations comprising:

performing wireless communication; and selecting a setting for transmission control or reception control in the wireless communication, wherein the setting is selected based on the wireless communication is one of a non-orthogonal multiple access or an orthogonal multiple access, and the setting includes:
- a setting associated with a transport block size, wherein the transport block size for the non-orthogonal multiple access is smaller than the transport block size for the orthogonal multiple access; and
- a setting regarding a resource allocation unit associated with allocation of resources, wherein the resource allocation unit for the non-orthogonal multiple access is larger than the resource allocation unit for the orthogonal multiple access.

15. The wireless communication apparatus according to claim 1, wherein the control section is further configured to:

switch to Grant-based transmission based on the wireless communication is the orthogonal multiple access; and switch to Grant-free transmission based on the wireless communication is the non-orthogonal multiple access.

* * * * *